(12) United States Patent
Horiye et al.

(10) Patent No.: US 12,533,621 B2
(45) Date of Patent: Jan. 27, 2026

(54) FILTER ELEMENT AND METHOD FOR PRODUCING A FILTER ELEMENT

(71) Applicant: MANN+HUMMEL GmbH, Ludwigsburg (DE)

(72) Inventors: Adriano Horiye, Ludwigsburg (DE); Thilo Mueller, Karlsruhe (DE); Sven Epli, Heilbronn (DE); Daniel Schmid, Sachsenheim (DE); Andreas Beck, Kirchheim (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 255 days.

(21) Appl. No.: 18/107,261

(22) Filed: Feb. 8, 2023

(65) Prior Publication Data

US 2023/0182059 A1  Jun. 15, 2023

Related U.S. Application Data

(63) Continuation of application No. PCT/EP2021/070919, filed on Jul. 27, 2021.

(51) Int. Cl.
| | |
|---|---|
| *B01D 46/52* | (2006.01) |
| *B01D 46/00* | (2022.01) |
| *F02M 35/024* | (2006.01) |

(52) U.S. Cl.
CPC ....... *B01D 46/523* (2013.01); *B01D 46/0001* (2013.01); *F02M 35/02408* (2013.01); *F02M 35/02491* (2013.01)

(58) Field of Classification Search
CPC .............. B01D 46/523; B01D 46/0001; B01D 46/521; B01D 46/522
See application file for complete search history.

(56) References Cited

U.S. PATENT DOCUMENTS

| | | |
|---|---|---|
| 3,216,578 A | 11/1965 | Wright et al. |
| 5,622,583 A | 4/1997 | Ernst et al. |
| (Continued) | | |

FOREIGN PATENT DOCUMENTS

| | | |
|---|---|---|
| DE | 29807580 U1 | 9/1998 |
| DE | 19737954 A1 | 3/1999 |
| (Continued) | | |

OTHER PUBLICATIONS

Office Action in corresponding Chinese Appln. No. 202180050047.7, Jul. 31, 2025, 10 pages, China.

*Primary Examiner* — Robert Clemente

(57) ABSTRACT

A filter element for filtering fluid has a fold pack formed of a filter medium folded in a zigzag shape or corrugated shape and provided with fold sections delimited by fold edges. The fold sections include at least two directly neighboring fold sections connected to each other by an adhesive connection of an adhesive material and extending along an adhesive line. The adhesive line extends at least in sections obliquely to the fold edge positioned between the at least two directly neighboring fold sections or the adhesive line extends offset along the fold edge positioned between the at least two directly neighboring fold sections. A filter element with one or more adhesive walls of an adhesive material extending within the fold pack and formed by adhesive connections of directly neighboring fold sections of the fold pack is provided. A method for producing such filter elements is provided.

33 Claims, 19 Drawing Sheets

(56) References Cited

U.S. PATENT DOCUMENTS

| | | | |
|---|---|---|---|
| 6,485,544 B1 * | 11/2002 | Ziske | B01D 46/10 55/497 |
| 10,213,723 B2 | 2/2019 | Epli | |
| 2002/0033224 A1 | 3/2002 | Lippold | |
| 2009/0114590 A1 | 5/2009 | Merritt et al. | |
| 2012/0085696 A1 | 4/2012 | Schloer | |
| 2012/0223008 A1 | 9/2012 | Mbadinga-Mouanda et al. | |
| 2012/0261333 A1 | 10/2012 | Moran et al. | |
| 2015/0113929 A1 | 4/2015 | Jackson | |
| 2015/0375156 A1 | 12/2015 | Sullivan | |
| 2017/0056807 A1 | 3/2017 | Klein et al. | |

FOREIGN PATENT DOCUMENTS

| | | |
|---|---|---|
| DE | 19749598 A1 | 5/1999 |
| DE | 102013015648 A1 | 3/2015 |
| DE | 102014015905 A1 | 5/2015 |
| DE | 102016007459 A1 | 12/2017 |
| GB | 2020995 A | 11/1979 |
| GB | 2352195 A | 1/2001 |

* cited by examiner

FILTER ELEMENT AND METHOD FOR PRODUCING A FILTER ELEMENT

CROSS-REFERENCE TO RELATED APPLICATIONS

This application is a continuation application of international application No. PCT/EP2021/070919 having an international filing date of 27 Jul. 2021 and designating the United States, the international application claiming a priority date of 31 Jul. 2020 based on prior filed German patent application No. 10 2020 120 248.2, the entire contents of the aforesaid international application and the aforesaid German patent application being incorporated herein by reference.

BACKGROUND OF THE INVENTION

The present invention concerns a filter element for filtering a fluid, in particular for filtering combustion air in a motor vehicle and/or for filtering working fluids of a motor vehicle, as well as a method for producing such a filter element.

DE 10 2014 015905 A discloses a flat filter element with a filter bellows of a filter medium that is folded along fold edges in a zigzag shape. The fold edges each extend between oppositely positioned end face edges of the filter bellows. On fold edges of the folded bellows, straight supporting glue beads extending adjacent to the end face edges are applied and connect neighboring folds and stabilize the filter bellows and, in this way, effect sealing between raw air space and clean air space. For example, in case of cabin air filters, the filter element can comprise furthermore one or a plurality of stabilization elements, in particular lateral strips and/or head strips (also referred to as end face strips) which at least in sections stabilize the filter medium in order to maintain its shape, in particular in filtering operation. The stabilization elements can form in particular a closed or open frame—also as a material-monolithic piece—which surrounds the filter medium. A disadvantage of the flat filter element according to DE 10 2014 015905 A is that the regions which are located in the region of the end face edges cannot be used or a separate sealing by a lateral strip or the like is required.

GB 2 352 195 A describes a HEPA round filter of glass fiber paper. Two concentric glue connections are provided by means of adhesive beads for stabilizing the cylindrical folded bellows wherein the inner adhesive bead is thinner than the outer one.

EP 0 645 170 B1 describes a method for producing a plate-shaped filter insert, comprised of a filter means folded in a zigzag shape, wherein folding edges are embossed in a first working step. Subsequently, with glue application devices that are provided with glue application nozzles, two glue beads are applied onto the surface of the filter means. Subsequently, folding is carried out. The glue application nozzles move transversely to the transport direction of the filter material so that two parallel extending glue beads are produced while the filter material is moved along the transport direction. A cutting device separates the folded filter material transversely to the machine running direction into individual filter elements. Moreover, a separation cut with a further cutting device is carried out between the parallel extending glue beads. The two glue beads each form a fluid-tight side of the two resulting filter elements.

DE 10 2020 047 894 A1 discloses a filter element comprising a folded filter medium with fold valleys and fold walls, wherein the filter medium is comprised of a base body, wherein the base body has a flank which is reinforced by a plastic reinforcement part. This flank is connected to the reinforcement part, wherein the plastic reinforcement part receives fold valleys and fold walls of the filter medium. According to DE 10 2020 047 894 A1, such plastic reinforcements are designed as insertion pieces between which folds are clamped or which are connected by material fusion to the fold walls. The plug-in and gluing steps required in the production of the filter element for the insertion pieces from both sides of the filter medium in its folded state could be considered a disadvantage.

SUMMARY OF THE INVENTION

In view of this background, the present invention has the object to provide an improved filter element, in particular a filter element that can be produced with little expenditure.

Accordingly, a filter element for filtering a fluid with a fold pack is proposed. The fold pack is formed of a filter medium folded in a zigzag shape and/or in a corrugated shape with fold sections delimited by fold edges. In this context, at least two directly neighboring fold sections are connected to each other along an adhesive line by an adhesive connection by means of an adhesive material. The adhesive line extends at least in sections obliquely to the fold edge which is positioned between the two directly neighboring fold sections. As an alternative or in addition, the adhesive line extends at least in sections offset in direction along the fold edge which is positioned between the two directly neighboring fold sections.

The filter element is in particular configured for filtering combustion air in a motor vehicle and/or for filtering working fluids of a motor vehicle, as an ambient air filter or as a vehicle-supported or stationary fine particle filter. In embodiments, the filter element is an air filter, in further embodiments it is configured as a cabin air filter. An embodiment for liquid filters is possible also. In case of a fold pack of filter medium folded in a zigzag shape, one also speaks of a folded bellows. The filter medium is also referred to as filter material.

The adhesive connection serves for stabilization of folds of fold edges and fold sections in the interior of the fold pack. In this context, the adhesive connection in embodiments for stabilization of the fold pack is arranged spaced apart from at least one side of the fold pack or a lateral end portion of the filter element. The distance along the fold edge direction between the adhesive connection and the respective side of the fold pack or a further adhesive connection is preferably selected such that, for intended operation, the fold edges and/or fold sections will not become damaged or deformed by the flow of fluid to be filtered therethrough in such a way that a filtration quality is impaired.

The stabilizing effects are expressed by the increase of the second moments of area. Depending on the embodiment, the second moment of area of the filter bellows is increased, on the one hand, and its resistance in relation to a flow force-caused bending is increased in this way. Within the folded bellows, an adhesive connection effects in the surrounding fold sections additionally a second moment of area increase of the fold sections themselves so that their resistance capability in relation to a flow force-induced bending of the folds is improved. Both partial effects of the adhesive connection improve together the failure situation of an excessive element deformation, in particular in the operating situation with moist or wet filter element in which the mechanical properties of the filter material may be significantly reduced.

The adhesive connection is present in this context in the interior of the fold pack and is in particular spaced apart, preferably with the same magnitude, from the sides of the filter elements formed by the fold profiles or fold profile edges.

In embodiments with a plurality of inwardly positioned adhesive traces, a division of the filter bellows into partial sections of identical width is advantageous for mechanical reinforcement.

The connection between neighboring fold sections is realized preferably exclusively by means of the adhesive material directly between the neighboring fold sections. Therefore, the adhesive material does not serve for fastening additional elements at the filter medium but represents a material-monolithic connection in the cured state.

In embodiments, the respective adhesive connection of the adhesive material, without further stabilizing separate parts or pieces, forms a support, sealing action and/or mechanical reinforcement of the filter medium in the interior of the fold pack.

In embodiments, the adhesive connection is arranged spaced apart between two fluid-tightly closed sides of the filter element. The sides can be, for example, sealed by lateral strips attached to lateral fold profiles. Conceivable is also a fluid-tight closure by a closure material such as PUR foam, adhesive or the like. The adhesive connection is provided in addition to the lateral sealing means in order to support the filter element at a spacing from the outer rims, to mechanically reinforce it and/or form a targeted flow guiding action within the filter element.

The folds of fold edges and fold section regions are formed during the production transversely to a machine running direction along which the filter medium is transported as a flat starting material. The adhesive connection extends, for example, across a plurality of folds of different orientation, in sections obliquely to the machine running direction. In embodiments, the adhesive connection extends in a curved manner relative to the machine running direction and is identically spaced apart in relation to the two sides of the filter element or fold pack. In this way, a uniform support of the fold pack in relation to the inflow surface and outflow surface of the filter element is achieved. As a result of the obliquely and/or offset extending adhesive line, it can be achieved that the adhesive connection, in relation to the inflow surface and outflow surface, delimits segments that are of the same size.

An adhesive line can be understood as a line or a region at or on the filter medium on which the adhesive material is applied and develops its adhesive action in relation to the fold sections. An adhesive line can extend across a plurality of fold sections and fold edges. Neighboring fold sections of the filter element are thereby connected to each other. The adhesive application on the adhesive line is realized during the production preferably in an unfolded state of the filter medium.

Due to an oblique or curved extension of the adhesive line in sections in relation to the fold edges, a stabilization element adapted to the respective outer geometry of the filter element is generated and can be adapted flexibly to the load distribution resulting from the pressure loss when flow passes through. Additional stabilization elements in the interior of the fold pack can therefore be dispensed with or such stabilization means can be realized more simply with respect to the material selection, their stability or geometry. The stabilization of the folds in the interior of the fold pack by adhesive connections permits a simple production because the adhesive application along the predetermined adhesive lines can be realized even before erecting the folds. In conventional methods, after producing the fold pack further steps must be performed for forming additional stabilization means which, for example, are to be attached on inflow-side or outflow-side fold edges.

In embodiments, the adhesive material is arranged exclusively at the inflow side or at the outflow side at the fold sections. By a one-sided application of adhesive material, adhesive material is saved; the weight increase of the filter element by adhesive material is reduced. A one-sided adhesive connection of fold sections to each other provides a sufficient reinforcement in flow direction. Moreover, the fold pack in case of a one-sided application can be bent about fold edges and, as needed, can be further processed to an endless folded bellows.

In other embodiments, the adhesive material is arranged at both sides of the filter medium, whereby a particularly strong stabilization of the fold sections which are connected to each other by means of the adhesive material is realized.

In embodiments, the adhesive material is applied between two fold edges, which delimit at least one of the directly neighboring fold sections, in a continuous manner along the adhesive line. The continuous application of the adhesive material effects a particularly uniform dissipation of a force which is acting from the exterior on the fold edges. The force, for example, of the type of gravitational or bending forces, is therefore distributed across the entire adhesive connection along the adhesive line.

The continuous application of the adhesive material permits a fluid-tight adhesive connection between the fold sections and a certain flow guiding action of the fluid to be filtered in the interior of the folded bellows due to the adhesive line which is oblique in relation to the machine running direction and the fold edge direction.

In embodiments, the adhesive lines of directly neighboring and oppositely positioned fold sections are positioned congruently opposite each other. In that the adhesive lines are positioned congruently opposite each other, less adhesive material can be used for the application. In particular, in case of a prior application of the adhesive material on both oppositely positioned fold sections which are to be connected to each other, a precise adhesive connection course is achieved. Due to the oblique or offset course of the adhesive lines in relation to the fold edges or the machine running direction, the adhesive lines are then provided mirror-symmetrically in relation to every other fold.

In embodiments, the adhesive connection is formed of two joined adhesive material applications. The two adhesive material applications adhere then on the directly neighboring and oppositely positioned fold sections and are connected to each other.

In embodiments, the adhesive lines of directly neighboring and oppositely positioned fold sections are positioned obliquely to each other such that the two joined adhesive material applications across the entire course are joined at or on the two oppositely positioned fold sections. In this variant, a continuous adhesive application across all fold edges of the glued fold sections is possible which simplifies the production. A still permitted offset or angle of the oppositely positioned adhesive lines of the directly neighboring and glued-together fold sections results from the quantity of the adhesive application. In the folded state, the two adhesive applications should still be contacting each other so that they form a continuous adhesive connection across the entire course.

In embodiments, the adhesive material is applied to outwardly facing fold edges and between the neighboring fold sections.

The application of the adhesive material on the fold edges which are facing outwardly enables a simple production. In the flat, unfolded state of the filter medium, the adhesive can be applied, for example, in a thread shape or bead shape, across the entire machine running direction and intersect the fold lines. No interruption of the adhesive application is required on the fold edges. In addition, a reliable reinforcement by the cured adhesive material is achieved.

In embodiments, the filter element comprises at least two adhesive connections along a respective adhesive line. The adhesive lines in this context are spaced apart from each other and extend respectively at least in sections obliquely to the fold edge which is positioned between the two directly neighboring fold sections or offset along the fold edge positioned between the two directly neighboring fold sections.

In this way, two-fold sections that are glued together can be stabilized with respect to their shape at a plurality of locations by an independent adhesive connection. The expansion of the filter element along the fold edges or the width of the filter element can be enlarged because the resulting spaced-apart adhesive connections form stabilization elements in the interior of the folded bellows, respectively.

In embodiments, a spacing between the two adhesive connections along the fold edges changes between different, in particular neighboring, fold edges. Due to the change of the spacing of the two adhesive connections from one to the next fold edge, an adaptation of the shape stability according to the local load of a respective fold edge can be achieved. The spacing, for example, is adapted along the machine running direction in such a way that same length sections are present, respectively, between the two adhesive connections relative to the respective outer side of the fold pack and between the adhesive connections. In this way, a uniform loading of the fold pack and a uniform reinforcement due to the adhesive connections in relation to the filter element width are achieved.

In embodiments, the respective adhesive connection extends across a plurality of fold sections connected to each other by the adhesive material and fold edges for forming an adhesive wall in the fold pack.

As an alternative, a filter element for filtering a fluid is also proposed, in particular for filtering combustion air in a motor vehicle and/or for filtering working fluids of a motor vehicle, wherein the filter element comprises a fold pack with an inflow side and an outflow side and wherein the fold pack is formed of a filter medium folded in a zigzag shape. The fold pack comprises a height between the inflow side and the outflow side, and at least one adhesive wall formed of an adhesive material extends within the fold pack. The adhesive wall is formed by adhesive connections of directly neighboring fold sections.

An adhesive wall can be understood as the totality of continuous regions of adhesive and regions of filter medium coated with adhesive (for example, along the adhesive lines) of a sequence of fold sections following each other along the machine running direction. In this respect, within the fold pack and the filter element, i.e., not closing off at the rim but located in the interior, a wall-type fixed stabilizing structure is produced which can be referred to as "adhesive wall". An adhesive wall effects a shape stability across a region of the filter element determined by the course of the adhesive wall and enables a targeted flow guiding action in the interior of the folded bellows.

An adhesive wall in this context is to be differentiated from a known thread coated with adhesive which is placed onto the fold tips, in particular in order to stabilize round filter elements. Such a thread defines a spacing of the fold tips relative to each other along the course of the thread. The thread does not penetrate between the folds and does not stabilize the folds. The fluid flow is not affected by a thread.

An adhesive wall fills between 50% and 100%, in particular at least 90%, of the surface between two folds perpendicularly to the running direction.

Due to the adhesive wall, it is possible in particular to dispense with stabilization grids attached additionally in or at the filter element, or such additional stabilization elements can be designed more simply. An adhesive wall can advantageously extend completely between the inflow side or inflow surface and the fold edge of the outflow side or outflow surface of the filter element or, in an alternative embodiment, extend completely between the outflow side or outflow surface and the fold edge of the inflow side or inflow surface of the filter element.

In addition or as an alternative, the adhesive wall can act as a flow guiding element in the interior of the fold pack. Due to a free design of the adhesive wall in the direction of the longitudinal side of the fold pack and along the flow direction transverse to the surface of the filter element, the fluid which is flowing through the filter element can be influenced in a targeted fashion in the flow direction. Moreover, cross-sectional constrictions in the flow direction are possible for influencing the flow rate in partial regions of the filter element. Due to the free design of the adhesive wall, the flow through the filter element can be adapted optimally to a housing configuration and/or the service life of the filter element can be improved.

In a particular embodiment, the adhesive walls cross each other and form thus individual flow regions within the fold pack. The segments formed of the regions enclosed by the adhesive walls can be provided with targeted inflow by a corresponding housing with inlet and outlet.

The adhesive walls can be slanted in flow direction and/or machine running direction in order to ensure a best possible flow distribution and/or flow rate.

In a particular embodiment, the slope of an adhesive wall in relation to the surface normal N of the outflow side or inflow side changes, for example, from 45° to −45°, in the direction of the length of the fold pack.

The interior of the filter element is formed, for example, by the inflow surface and the outflow surface which are formed by the plurality of fold edges visible from the exterior as well as by lateral boundaries of the fold pack which are fluid-tight or are formed of the filter medium. "Interior" can also be understood as the region of the filter element which cannot be handled easily from the exterior.

In embodiments, the filter element has a width along the fold edges, a length transversely to the width, and a height which corresponds to a fold height. The filter element in this context can be of a cuboid configuration with a rectangular outline but can also enclose an irregular volume, for example, due to installation space requirements. Conceivable are, for example, trapezoidal outlines of the inflow and/or outflow side but also a fold height which changes across the length and thus height of the filter element.

The adhesive wall extends in embodiments between the inflow side and the outflow side and can connect, in particular completely, the inflow side and the outflow side to each other between the inflow side or inflow surface and the fold edge of the outflow side or outflow surface of the filter element.

As an alternative, the adhesive wall extends between the outflow side and the inflow side and can connect, in particular completely, the outflow side and the inflow side to each other between the fold edge of the inflow side or inflow surface and the outflow side or outflow surface of the filter element.

In embodiments, the adhesive wall comprises an inflow-side edge and/or an outflow-side edge, wherein the inflow-side edge delimits an inflow surface of the filter element and/or the outflow side edge delimits an outflow surface of the filter element. The respective edge can form a closed contour or can define together with other lateral boundary elements, for example, lateral strips or seals, the cross-section surface along the flow direction.

The inflow surface of the filter element and the outflow surface of the filter element can have different sizes and/or geometries. By adaptation of the shapes, the flow is advantageously influenced.

The respective adhesive wall is in particular formed as a flow guiding element in the interior of the fold pack. The adhesive wall in this context is spaced apart from the rims of the fold pack and embodied in addition to the lateral sealing at the rims of the fold pack. Moreover, the adhesive wall can have further properties, such as stabilization or additional sealing functions.

In embodiments, the adhesive wall seals at least partially a clean fluid region from a raw fluid region. Such a separation enables the realization of particular configurations, for example, filter elements which comprise fastening means such as tie anchors or eyes in the interior.

In embodiments, the adhesive wall has at least in sections along the height an angle between 5° and close to 90°, preferably between 10° and 45°, particularly preferred between 10° and 30°, in relation to a surface normal of the inflow or outflow side. Such angles enable local accelerations or decelerations of the fluid along the flow path in the interior of the filter element. In the case of oppositely oriented inlet and outlet sockets of the filter housing, a reduction of the pressure loss of the filter element and/or a more uniform flow pattern across the inflow and/or outflow surface can be effected by such a flow displacement.

The adhesive wall divides the fold pack in particular in respect to the width into fold pack sections. A division of the fold pack by an adhesive wall increases the shape stability of the respective fold pack sections. Due to the course which is oblique or offset in relation to the machine running direction or the fold edge direction, the adhesive wall can be adapted to a changing width of the filter element. Therefore, the division of the fold pack sections in regard to the width can be adapted to a local pressure loss in operation which is predetermined by a filter receptacle and its inflow or outflow properties. As a whole, the filtration performance can be improved in this way.

In embodiments, the adhesive wall extends in the direction of the height at a slant and/or curved. A course of the adhesive wall extending in the direction of the height at a slant and/or curved enables a flexibly adapted shape stability. Moreover, a flow guiding action of the fluid to be filtered in the interior of the fold pack can be achieved. In this way, the filtration properties can be improved, and an efficient inner flow guiding action can be achieved.

In embodiments, the adhesive wall extends in the direction of length at a slant and/or curved. This permits an improved shape stability and an adaptable flow guiding action.

In embodiments, a height of the adhesive wall at least in sections is less than the height of the filter element.

In other embodiments, the adhesive wall is interrupted in the machine running direction at least in at least one region.

A height of the adhesive wall can be reduced in this respect in sections in relation to the height of the filter element. At locations of the filter element that are stressed less, adhesive material can therefore be saved. In this way, the filter surface which is present for filtration of the fluid is enlarged because less filter material is closed off by adhesive.

Moreover, by an in particular periodic interruption of the adhesive application in the region of the inflow-side and/or outflow-side fold edges, an adhesive wall with reduced height can be formed.

In embodiments, the adhesive wall is interrupted along the length of the filter element. In further embodiments, the adhesive wall is spaced apart from an end face of the filter element.

The end portion of the fold pack formed by an end fold or an end fold section can be understood as an end face, for example. It is also possible that a head strip forms the end face. An interrupted course of the adhesive wall makes it possible to stabilize the fold pack in its shape in particular at a site where it is particularly stressed due to the external requirement.

In embodiments, the adhesive wall in the fold pack has a closed shape. The adhesive wall in this context can extend along an irregular closed curve. The flow properties as well as the shape stability of the filter element can be improved in this way. A closed adhesive wall structure can support itself against itself and is particularly stable.

The shape stability of the fold pack and a particular flow guiding action can be achieved by an adhesive wall. Outer obliquely cut geometries of the filter element can be efficiently realized in this way without additional sealing components having to be adapted geometrically and having to be attached in additional steps.

In embodiments, a plurality of adhesive walls are provided. The plurality of adhesive walls can intersect each other.

Intersecting or contacting of a plurality of adhesive walls additionally increases the shape stability of the fold pack. Complex load distributions that act from the exterior on the filter element can thus be absorbed by the geometric structures of the adhesive walls. The adhesive walls insofar can form an inner complex support grid in the folded bellows.

In embodiments, the width of the filter element is divided uniformly along the length by spacings between the adhesive walls and spacings between the adhesive walls and sides of the filter element.

Due to the uniform division of the width of the filter element across the course of its length, the load stability and stability in particular of wide filter elements is increased because the maximally occurring leverage length of a bending force for creating a bending moment about fold regions fixed by reinforcement measures is minimal for uniform division.

Due to the adhesive walls which can be flexibly implemented with respect to their geometry, the stability as well as the filtration property of the filter element can be improved, respectively. Moreover, the adhesive walls form stabilization elements and flow guiding elements that can be produced with little expenditure.

In embodiments, the fold pack is bent to a cylinder-shaped endless folded bellows. In this context, in particular the end fold sections of the fold pack are fluid-tightly connected to each other.

By means of a corresponding endless folded bellows, a round filter geometry can be realized, for example. Optionally, end disks can be attached to the fold profiles which form the respective cover surfaces of the cylindrical round filter element.

Due to the adhesive connections, stabilizing adhesive walls can be formed which correspond to complex shaped surfaces within the folded bellows. Due to the supporting adhesive walls, it is possible, for example, to dispense with inner or outer support tubes which rest against inner or outer fold edges, or such support elements can be sized to be weaker or smaller.

In embodiments, the adhesive material comprises solvent-containing wet adhesives, contact adhesives, dispersion adhesives, hot melt adhesives, hot glues, plastisols, polyaddition adhesives, polycondensation adhesives, polymerization adhesives, dry-bond adhesives.

Conceivable is the use of adhesive materials that comprise polyamide. In embodiments, the adhesive material is a hot melt adhesive of a thermoplastic material, in particular polyamide hot melt resin.

The filter medium can be embodied folded or corrugated. As folds, for example, zigzag or W folds are known. The filter medium can be embossed and subsequently folded at embossed edges with formation of fold edges. A flat material filter web which will be correspondingly deformed can serve as a starting material. The filter medium is comprised preferably of a wet-laid, impregnated filter paper with high cellulose proportion.

The filter medium is, for example, a filter fabric, a laid filter material, or a filter nonwoven. In particular, the filter medium can be produced by a spun-bonding method or melt-blowing method. The filter medium can comprise cellulose, natural fibers such as cotton, or synthetic fibers, for example, of polyester, polyphenyl sulfide or polytetrafluoroethylene.

The filter medium can be of a single layer or multilayer configuration. It can comprise moreover an adsorption material such as active carbon.

A corresponding filter element serves for filtration of fluids, i.e., gaseous and/or liquid media, for example, air. A gaseous medium, or air, comprises here also gas or air/solid mixtures and/or gas or air/liquid mixtures. A filter medium can be designed to remove particles from an air flow.

In embodiments, the filter element comprises, in addition to the adhesive connection or the adhesive wall as stabilization element for the interior of the filter element, one or a plurality of additional stabilization elements. They can stabilize the filter medium at least in sections in order to maintain its shape, in particular in filtering operation. The additional stabilization elements can form in particular a closed or open frame—also as a material-monolithic piece—which surrounds the filter medium.

The additional stabilization elements can be connected to the filter medium at the rims by material fusion, in particular glued. For this purpose, the stabilization elements can be heated and the filter element can be pressed into the heated material. Alternatively, the additional stabilization elements can be injection-molded onto the filter medium. Moreover, an adhesive can be used as an additional material. The additional stabilization elements can even be produced of the same material as the filter element. Alternatively, the additional stabilization elements can be embodied as injection-molded plastic components. The additional stabilization elements can be stiff or flexible.

The filter element can comprise moreover a seal which seals a raw side correlated with the filter element relative to a clean side thereof. The seal can be embodied to be the same component as one or a plurality of additional stabilization elements of the filter element. Alternatively, the seal can be formed as an additional component. For example, the seal can be attached to the filter medium, to one or plurality of additional stabilization elements, to the filter element, or to the filter receptacle.

The filter element can be exchangeably fixed in the filter receptacle.

Moreover, a filter assembly with a filter element as described above or in the following and a filter receptacle, for example, in the manner of a housing, is proposed.

The filter element or the filter assembly can be used in passenger cars, trucks, construction machines, watercraft, rail vehicles, aircraft as well as generally in air conditioning, in particular in heating and air conditioning devices, in household devices, in fuel cells or in the building technology. The motor vehicles or vehicles can be operated electrically and/or by means of fuel (in particular gasoline or diesel). In respect to the building technology, in particular stationary devices for the treatment of air are conceivable.

Moreover, a method for producing a filter element is proposed. The steps performed in the production method are: providing a flat filter medium; applying an adhesive material along a predetermined adhesive line; folding the filter medium along predetermined fold lines by means of which neighboring fold sections are delimited. In this way, in particular fold edges are formed which are present between the fold sections. In a further step, the adhesive material for forming an adhesive connection is cured between neighboring fold sections. The adhesive material in the method is applied such on the respective adhesive line that the adhesive line at least in sections extends obliquely to or offset along the fold line which is positioned between the respective neighboring fold sections, wherein a spacing is maintained to the rim of the filter medium.

The production method serves in particular for producing a filter element as described above or in the following.

Preferably, the application of the adhesive material is carried out prior to the step of forming the fold edges. One can say that folding or pleating of the flat filter medium is realized after application of the adhesive material.

A fold line can be understood as a line which is formed by the folding process to a fold edge. One can say that the fold line and a fold edge coincide in the folded state of the filter medium. A fold line determines therefore the position and the course of folding in the manner of the fold edge.

An adhesive line is, for example, a line or curve on the filter medium along which the filter medium is covered by adhesive material. As a function of the consistency of the adhesive application, it can be referred to as adhesive thread, adhesive bead or the like.

In that the adhesive material is applied at a slant to a fold line or offset thereto in sections, courses of adhesive material can be realized by the production method which effect a support of the filter medium taking into consideration the shape of the filter element. Support elements that are additionally inserted in or attached to the filter element can be preferably dispensed with. In any case, the respective adhesive connection leads to a stabilization of the folds.

The strength of the adhesive connection or the geometry of the adhesive line of the filter element can be adapted to a load which is acting from the exterior on the filter element. A load is produced in particular by a pressure drop between the clean side and the raw side of the filter element in operation. For example, the thickness of the adhesive application along the course of the adhesive line can be varied in order to generate inner support grid structures of different stability.

In embodiments of the method, the adhesive material is applied in a flowable state. In this context, the viscosity, for example, in case of hot melt adhesive, can be adjusted by the temperature and/or composition such that the desired adhesive application is realized.

In embodiments of the method, the adhesive material is applied in particular by continuous extrusion by means of an application nozzle which is moveable along the fold lines. In this way, the thickness of the adhesive application along the adhesive line can be controlled.

The adhesive application nozzle movable transversely to the machine running direction enables a flexible course of the adhesive lines relative to the fold lines which extend also transversely to the machine running direction.

Alternatively, also tiltable nozzles or nozzles that can be moved in other ways transversely to the machine running direction can be used in order to realize a flexible course.

In embodiments of the method, the application of the adhesive material is interrupted at least in sections along the adhesive lines. By an interruption of the adhesive line, the adhesive connection can be limited to a particularly stressed region of the filter element.

In embodiments of the method, the flat filter medium is conveyed along a machine running direction which extends transversely to the fold lines. In this way, it is sufficient for producing complex geometries to move the application nozzle back and forth in a direction transversely to the course of the filter medium and interrupt the adhesive application as needed. This simplifies the construction of the production line.

In embodiments of the method, the adhesive material is applied simultaneously along different adhesive lines. For example, a plurality of application nozzles can be used adjacent to each other or one after another in the machine running direction. In this way, a plurality of adhesive walls can be produced adjacent to each other simultaneously.

In embodiments of the method, one or a plurality of the following method steps are performed: embossing the filter medium along the fold lines; fixing the folded filter medium during curing of the adhesive material; applying a lateral strip to lateral fold profiles; and/or cutting of the folded filter medium provided with the adhesive connections for forming a fold pack.

The aforementioned method steps can be performed in particular in the indicated sequence. However, deviating sequences are also conceivable. For example, the application of the lateral strip can also be carried out after cutting the fold pack.

Furthermore, a use of a filter element explained above or in the following in a method for filtering fluid is proposed. In the filtering method, a fluid to be filtered is guided in the interior of the fold pack by means of flow guiding elements which are formed preferably of adhesive walls, as described above.

Further possible implementations of the invention comprise also combinations, not explicitly mentioned, of features or method steps described above or in the following in respect to the embodiments. In this context, a person of skill in the art will also consider individual aspects as improvements or supplements to the respective basic form of the invention. The aspects, advantages, and effects explained in respect to the filter element apply likewise to the corresponding aspects of the production method, and vice versa.

Further embodiments of the invention are subject matter of the dependent claims as well as of the embodiments of the invention described in the following. Furthermore, the invention will be explained in more detail with the aid of embodiments with reference to the attached Figures.

BRIEF DESCRIPTION OF THE DRAWINGS

In the Figures, same or functionally the same elements, if nothing to the contrary is indicated, are provided with the same reference characters.

DESCRIPTION OF PREFERRED EMBODIMENTS

Figure 1:
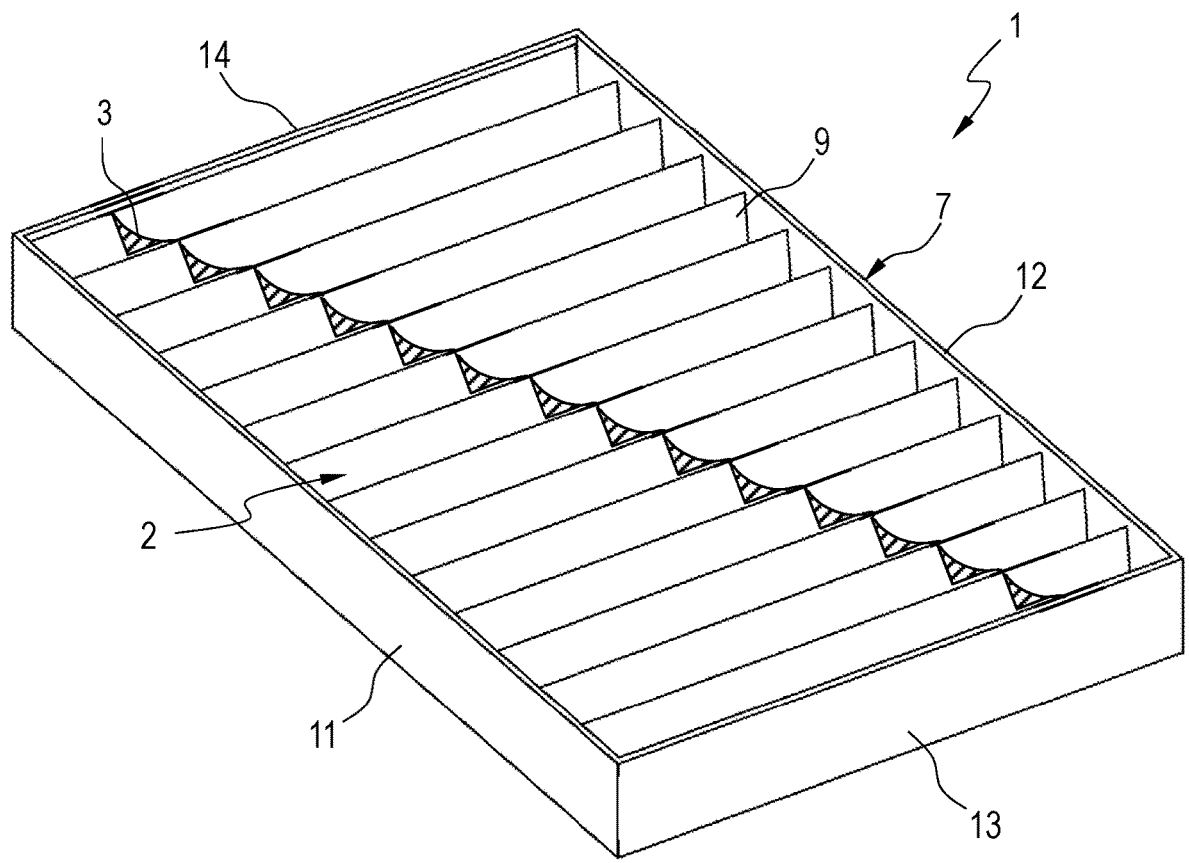
FIG. 1 shows a perspective illustration of a first embodiment of a filter element.

FIG. 1 shows a first embodiment of a filter element 1. The filter element 1 contains a flat filter medium 9 which is folded to a fold pack 2 and is framed by lateral and head strips 11, 12, 13, 14. The fold pack 2 is illustrated without frame 7 in FIG. 2. The lateral strips 11, 12 illustrated in FIG. 1 are connected to the fold end face edges or the outer fold profiles 19, 20, and the head strips 13, 14 to the end folds 17, 18, in particular by fusing, welding or gluing. The lateral strips 11, 12 as well as the head strips 13, 14 can form the frame 7 as one part or as a multi-part configuration. The lateral strips 11, 12 as well as the head strips 13, 14 can be produced, for example, of an in particular flexible fiber material or in particular as stiff injection-molded plastic parts and form a circumferentially extending frame 7. As an alternative or in addition, such a frame 7 can also be produced by injection-molding onto the filter medium 9.

Figure 2:
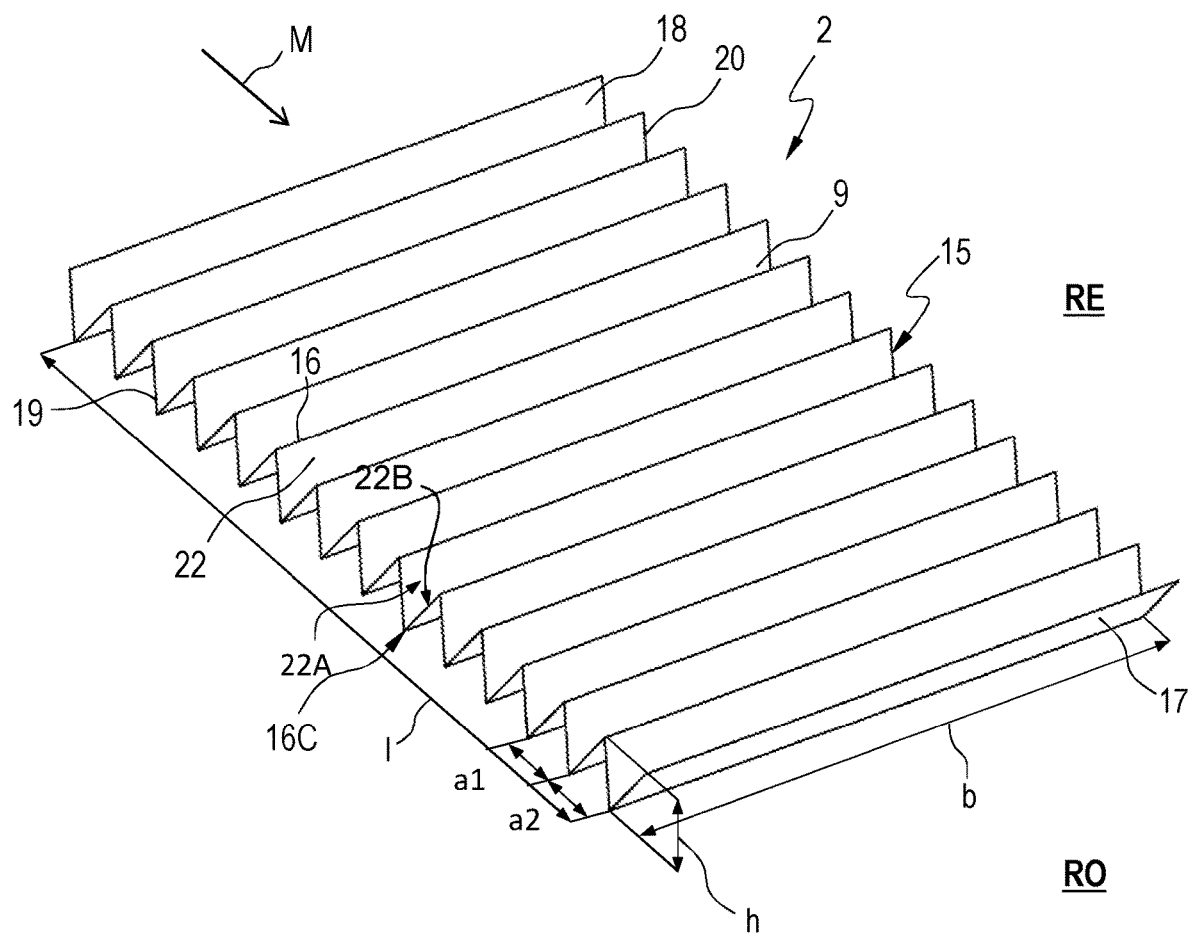
FIG. 2 shows a perspective illustration of a suitable fold pack for the filter element according to FIG. 1.

An adhesive wall 3 extends at a spacing from the lateral strips between the head strips 13, 14 obliquely through the fold pack 2. The adhesive wall 3 divides the fold pack 2 and reinforces it in its folded form. The adhesive wall 3 is formed by respective neighboring fold sections connected to each other and extends obliquely to a machine running direction M which is indicated in FIG. 2. The adhesive connections between fold sections is realized also obliquely relative to the fold edges 16. The adhesive connection resulting by means of adhesive material along an adhesive line on the surface of the filter medium 9 serves for stabilizing the fold pack and can be understood as an internal support element.

FIG. 2 shows a filter medium 9 folded as a fold pack 2 which can be used in the filter element according to FIG. 1. The adhesive connection of directly neighboring fold sections for forming the stabilizing adhesive wall is not illustrated in FIG. 2. The filter medium 9 is folded in a zigzag shape to the fold pack 2 and has a plurality of parallel folds 15 which extend transversely to a machine running direction M. When producing the folds 15, the flat filter medium 9 is compressed in the machine running direction M so that the folds 15 are erected. The folded filter medium 9 is also referred to as pleating. The folds 15 can be produced by means of folding along sharp fold edges 16 (also referred to as fold tips) but also by a corrugated configuration of the filter medium 9. A respective fold 15 is defined by two directly neighboring fold sections 22 which are connected to each other by a corresponding fold edge 16. The neighboring fold sections 22A, 22B adjoin each other by a common fold edge 16C. Along the machine running direction M, the orientations of the folds 15 alternate for forming the zigzag-shaped pleating. The fold distance between neighboring fold edges of the same orientation is indicated by a1, a2.

Laterally, one can see the zigzag-shaped fold profile 19, 20 which delimits the fold pack 2 laterally. The end faces are formed by end fold sections 17, 18. The fold pack 2 encloses in this context a cuboid volume with a rectangular base surface of the length l along the machine running direction M, or transverse to the fold extension, and a width b along the fold edges 16. The fold pack 2 has moreover the height h which results from the fold height and the angle of the folds. In the orientation of FIG. 2, the fluid to be filtered, in particular internal combustion air, flows from the bottom to the top of the fold pack 2. The folded filter medium 9 separates in this context the raw fluid region RO from the clean fluid region RE.

Figure 3:
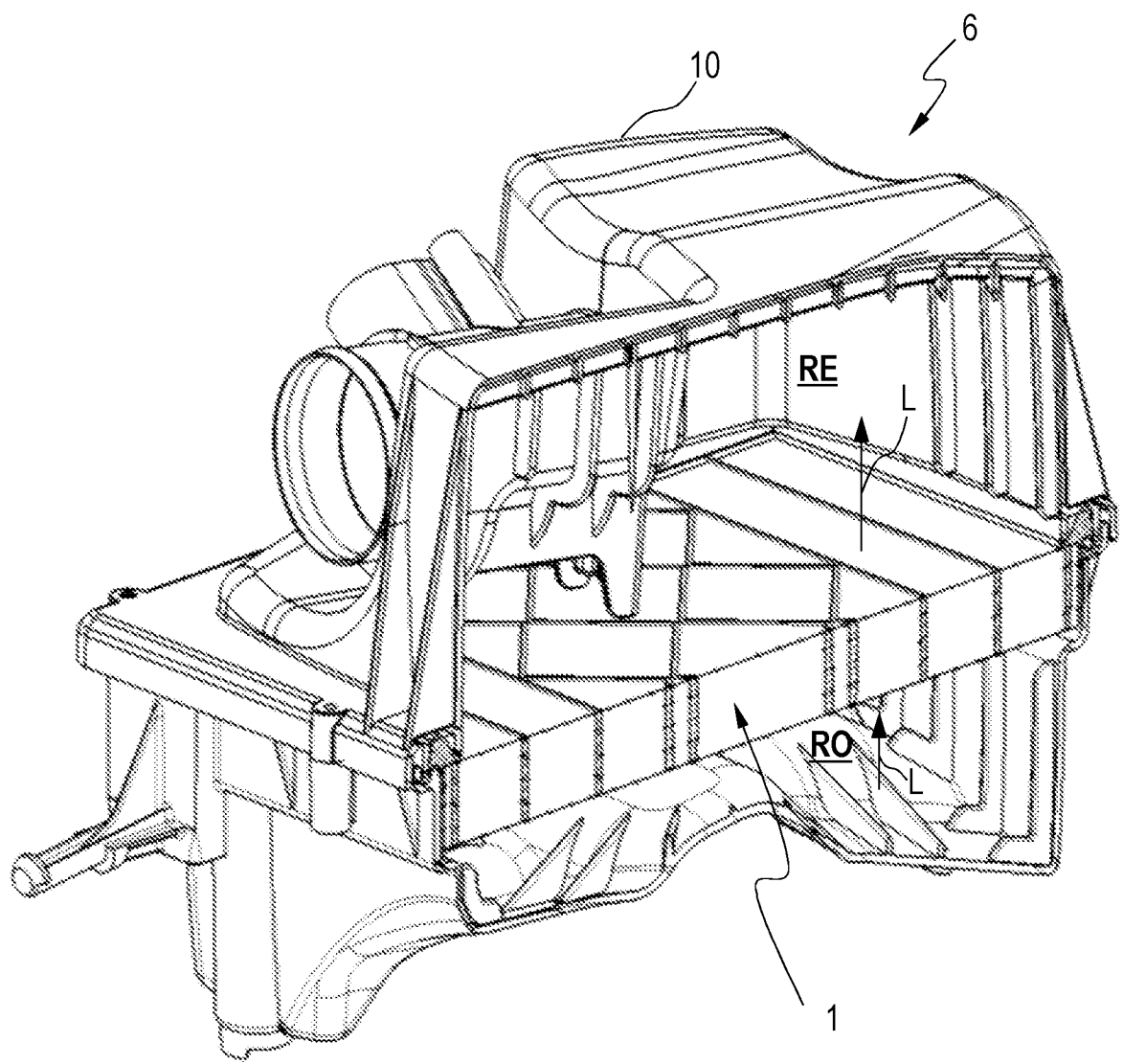
FIG. 3 shows a perspective illustration of a filter assembly with a filter housing and an embodiment of a filter element.

FIG. 3 shows schematically a filter assembly 6 in which a filter element according to FIG. 1 is received in a housing 10. The air to be filtered flows in this context from the raw side RO of the filter element 1 toward the clean side RE thereof (arrows L). In order to ensure a satisfactory lateral sealing action between the raw and the clean side RO, RE, a seal 9A can be provided between the filter element 1 and the filter housing 10. This seal 9A is formed, for example, as a foamed-on PUR seal.

Figure 4:
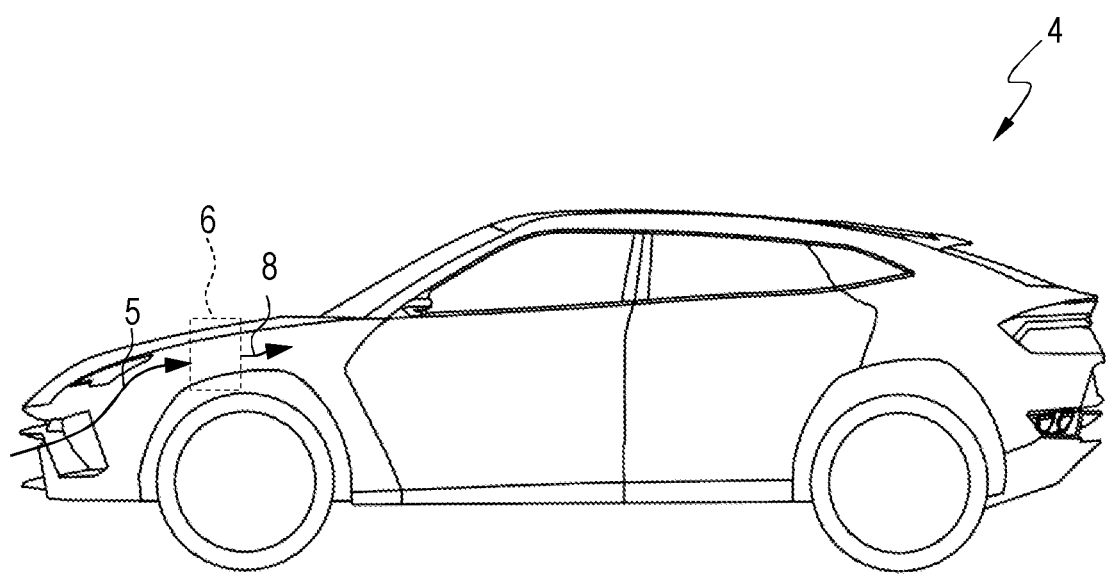
FIG. 4 shows a schematic illustration of a motor vehicle with a filter assembly according to FIG. 3.

FIG. 4 shows a motor vehicle 4 with a corresponding filter assembly 6 for filtering combustion air. In this context, an intake device takes in external air 5 and supplies it to the filter assembly 6. The filtered clean air 8 is then further conducted to the combustion engine of the vehicle.

In particular when using the filter element 1 in a filter assembly 6 for filtering combustion air of a motor vehicle, the filter element 1 is exposed to a high pressure difference between the raw and the clean air side RO, RE. In particular at the center of the inflow surface, forces which can deform the folds and therefore impair the filter properties are acting on the filter element 1 due to the pressure drop between the raw and clean side RO, RE. In order to reinforce the fold pack 1 in the interior and to support the folds when under load in operation, adhesive connections between neighboring fold sections along the machine running direction are provided, as indicated in FIG. 1 as adhesive wall 3. The adhesive wall 3 furthermore acts as spacer for oppositely positioned fold sections. Moreover, further outer support elements, such as stabilization grids or rigid comb structures engaging in the folds, can be provided at the filter element 1.

In the embodiment of FIG. 1, an adhesive connection of neighboring fold sections and fold edges with an adhesive material is now provided. This is explained in more detail in FIGS. 5-8. The adhesive material in this context is a hot glue that is applied along an adhesive line in liquid or pasty form prior to folding the filter medium 9.

Figure 5:
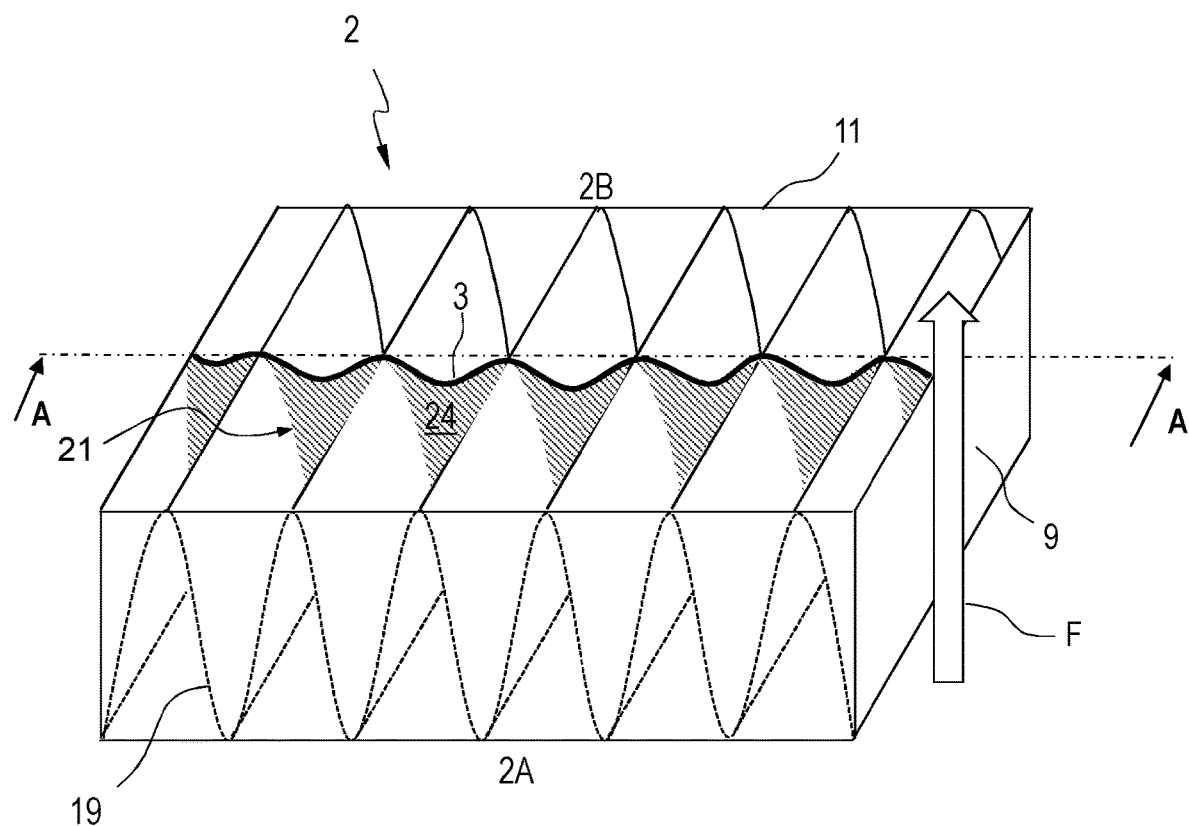
FIG. 5 shows a detail of the fold pack used in the filter element according to FIG. 1 in a perspective illustration with an adhesive wall.

In FIG. 5, a detail of the fold pack 2 of the first embodiment of the filter element according to FIG. 1 is illustrated. An adhesive wall 3 of cured adhesive material 24 and of regions of the filter medium 9 which are coated with the adhesive material 24 extends through the interior of the fold pack 2. The coated regions follow an adhesive line 21 on the filter medium 9. An exemplary flow direction F is indicated so that in the orientation of FIG. 5 a bottom inflow side 2A and a top outflow side 2B of the fold pack 2 are provided.

Figure 6:
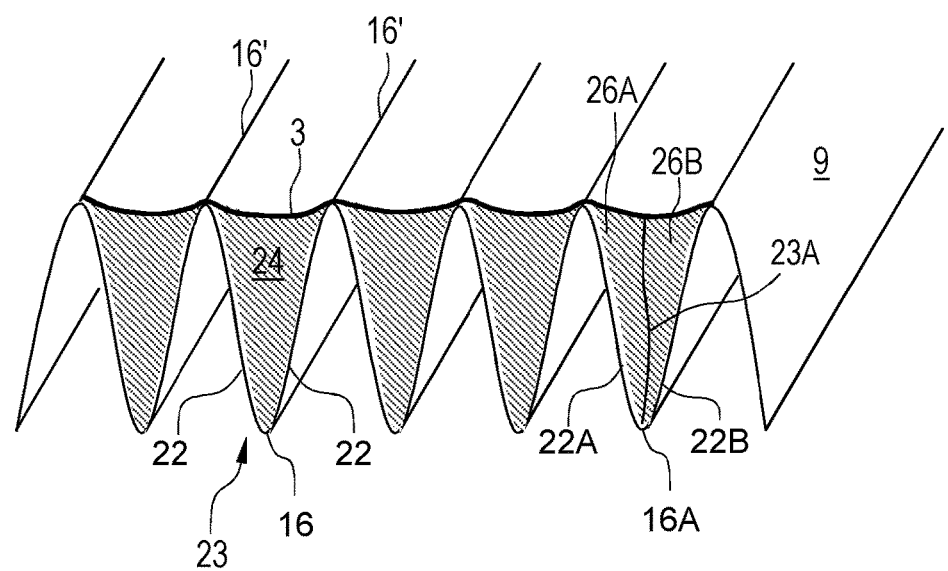
FIG. 6 shows a section AA along the adhesive wall illustrated in FIG. 5 in perspective view.

A section view AA of the fold pack 2 along the adhesive wall 3 is shown in FIG. 6. The adhesive wall 3 extends respectively completely between neighboring fold sections 22 separated from each other by a fold edge 16 and connects them as adhesive connection 23. The adhesive wall 3 follows the fold shape and holds the folds in their cross section shape. The height of the adhesive wall 3 illustrated in FIG. 6 corresponds to the fold height, wherein a portion of the adhesive wall 3 in addition projects past the upper fold edges 16'. The adhesive wall 3 extends across several neighboring folds of two fold sections 22 and a fold edge 16, respectively.

The adhesive connection 23 is achieved by contacting at least one adhesive application on the neighboring fold sections along an adhesive line. Due to a folding process along the bottom fold line for forming the fold edge 16A, the oppositely positioned sides of the at least one adhesive application are joined and a fixed connection is produced along the boundary surface 23A, as indicated in FIG. 6 to the right.

Figure 7:
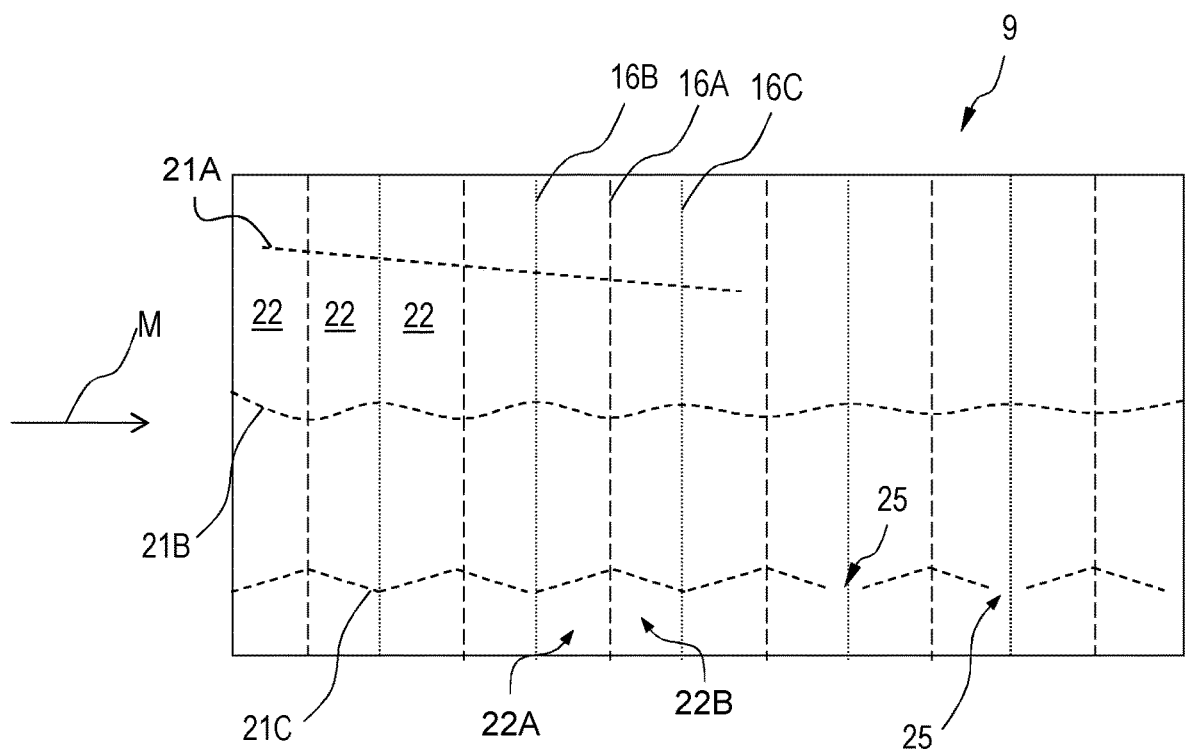
FIG. 7 shows a detail of an unfolded filter medium with different adhesive lines.
Figure 8:
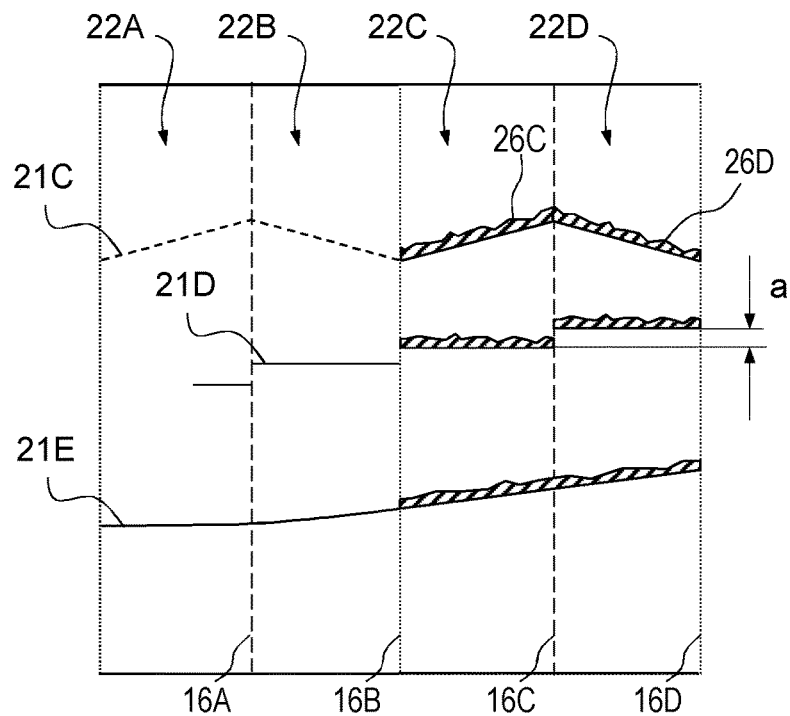
FIG. 8 shows a detail view of the filter medium according to FIG. 7.

For explaining the course of the adhesive connections 23 in the fold pack 2, FIGS. 7 and 8 show adhesive lines along which the adhesive application 26 and, as a result, the adhesive connection 23 is realized, as well as fold lines which define as a result the fold edges 16 on the surface of the filter medium 9.

In FIG. 7, a filter medium 9 that has been unfolded is therefore illustrated. On the filter medium 9, fold lines which are illustrated as dashed 16A and dotted lines 16B, 16C extend between the fold sections of which only a selection is provided with reference characters 22. Two neighboring fold sections 22A, 22B are separated from each other by a fold edge 16A. In addition, the neighboring fold sections 22A, 22B are delimited by the two fold edges 16B, 16C adjoining the fold sections 22A, 22B.

Furthermore, FIG. 7 shows three exemplary adhesive lines 21A, 21B, 21C. Along the adhesive line, the respective neighboring fold sections are connected to each other by the adhesive material applied thereon so that an adhesive wall is formed.

The adhesive line 21A extends obliquely to the fold edges and obliquely to the machine running direction M across a limited number of fold sections 22. In the folded state, this results in an adhesive wall which extends at a slant to the machine running direction and extends across the entire height but not across the entire length of the fold pack.

The adhesive line 21B extends in a corrugated shape across all of the fold sections 22 illustrated in FIG. 7. The adhesive line 21B extends mirror-symmetrically for neighboring fold sections 22A, 22B, respectively, in relation to the fold line 16A separating them. In this way, the adhesive traces applied to the adhesive line 21B are brought into congruent position and form an adhesive wall which extends across the length of a plurality of neighboring fold sections.

The adhesive line 21C extends in a zigzag shape and is embodied mirror-symmetrically in respective neighboring fold sections 22A, 22B in relation to the fold line 16A separating them. In this way, a precise reliable adhesive connection is achieved. The adhesive line 21C is moreover interrupted at two locations 25 in the region of fold lines.

The adhesive lines 21A, 21B, 21C extend in sections obliquely to a respective fold edge 16A, wherein the fold edge 16A is positioned between the respective neighboring fold sections 22A, 22B. FIG. 8 illustrates the corresponding adhesive application on the respective adhesive line. Fold sections 22A—22D that are delimited by fold lines 16A—16D are illustrated enlarged. In this context, the application of the adhesive material is indicated to the right of the fold line 16B with crosshatching along the respective adhesive line. To the left of the fold line 16B, the respective adhesive line is shown without adhesive application. The adhesive line 21C corresponds to that shown in FIG. 7 and extends in a zigzag shape along the machine running direction. Adhesive material 26C, 26D is applied onto the fold sections 22C and 22D and is congruently joined for adhesive connection.

As an alternative or in addition, an adhesive line extends offset in sections along the fold edge 16A which is positioned between the neighboring fold sections 22A, 22B. The sections of the adhesive line 21D which are applied onto different fold sections have an offset in direction of the fold lines relative to each other that is identified by a. The resulting adhesive connection then is displaced from fold edge 16B to fold edge 16D by the offset a. This results in a resulting adhesive wall obliquely extending relative to the longitudinal direction of the fold pack.

A further embodiment is shown by the adhesive line 21E whose course across a plurality of fold lines extends at a slant to the machine running direction so that in the folded filter pack along the length l a curved adhesive wall is formed whose adhesive beads arranged at neighboring fold sections are not, or only partially, congruently positioned.

Figure 9:
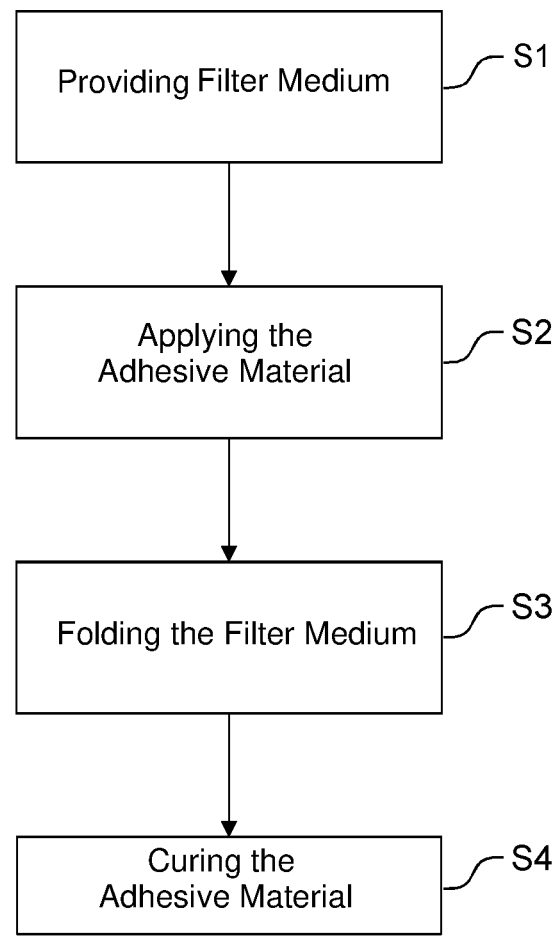
FIG. 9 shows method steps of an embodiment of a production method for a filter element.
Figure 10:
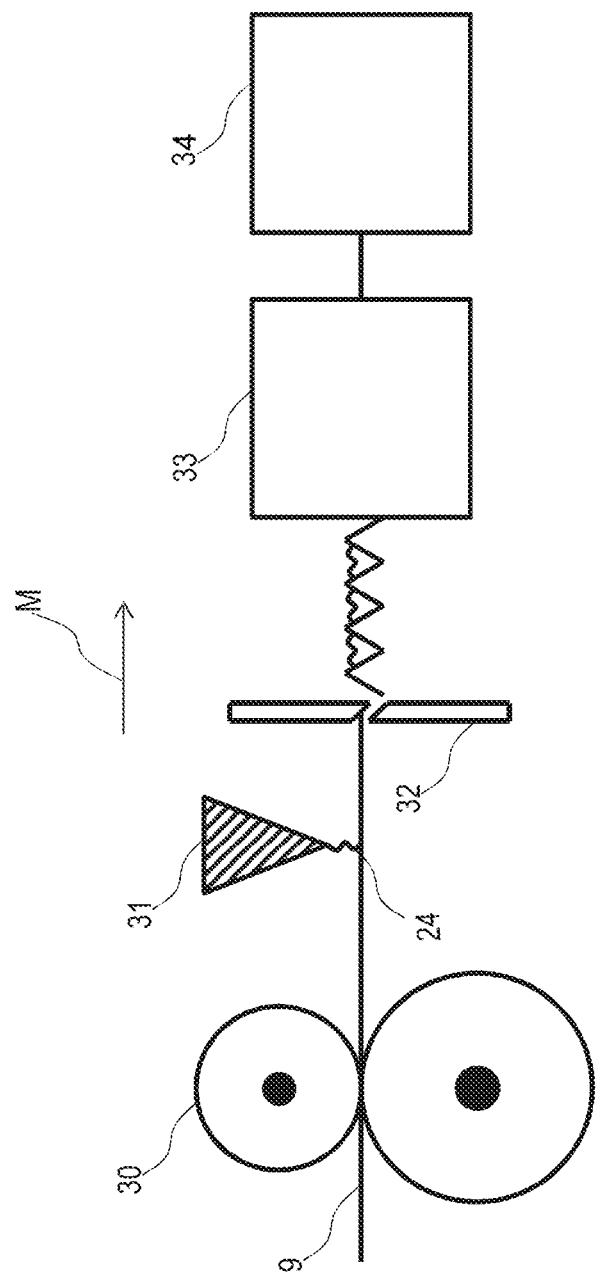
FIG. 10 shows a schematic illustration of a device for performing the production method according to FIG. 9.

In the following, a method for producing a filter element, as illustrated in FIG. 1, for example, is described with the aid of FIG. 9 and FIG. 10. FIG. 9 shows a sequence of possible method steps, and FIG. 10 illustrates schematically a device for performing the production method.

In a first step S1, the flat filter medium 9 is provided. The filter medium for this purpose is supplied, for example, as roll material to a conveying device. For this purpose, an endless filter medium as it is illustrated in FIG. 10 can be first compressed flat and/or pre-embossed by rollers 30 and conveyed along the machine running direction M.

In a step S2, the adhesive material 24 is applied along predetermined adhesive lines onto the filter medium 9. The adhesive lines extend obliquely with respect to the machine running direction M and in relation to the folds to be produced, as indicated in FIGS. 7 and 8, for example. The adhesive material is embodied as a hot glue in the described embodiment and is applied as an adhesive thread onto the conveyed filter medium by means of a dispenser 31 with an application nozzle movable transversely to the machine running direction M. The application nozzles enable, for example, a fast on/off switching of the adhesive application. The use of a plurality of adhesive nozzles parallel to each other is conceivable, wherein the melted hot glue is applied simultaneously along different adhesive lines. The application can be automatically realized by means of a program control. The respective application quantity is metered such that adhesive threads exiting from the application nozzle have a respective desired thickness. When using a plurality of nozzles, they can undercut each other so that overlapping adhesive traces are possible.

In a further step S3, the filter medium 9 with applied adhesive material traces is folded by a folding device 32. The fold lines 16 can be pre-embossed in this context. Due to folding, the applied and not yet cured adhesive traces are joined at oppositely positioned fold sections in order to form an adhesive connection. The shape and structure of the fold pack is thereby produced.

Subsequently, the adhesive material present in the folded filter medium 9 is cured in step S4. This can be done by cooling the hot glue, for example, by means of a fan 33.

By means of a cutting device 34, the fold packs stabilized by the adhesive walls are cut to the required shape needed for the respective application. In addition, for further stabilization, lateral strips, head strips and/or seal frames can be attached to the fold pack.

In the following, further embodiments of filter elements for air filters with different geometries and courses of the adhesive walls as inner support elements will be explained. In this context, repeating elements will only be explained when first mentioned and the respective reference character is used thereafter.

Figure 11A:
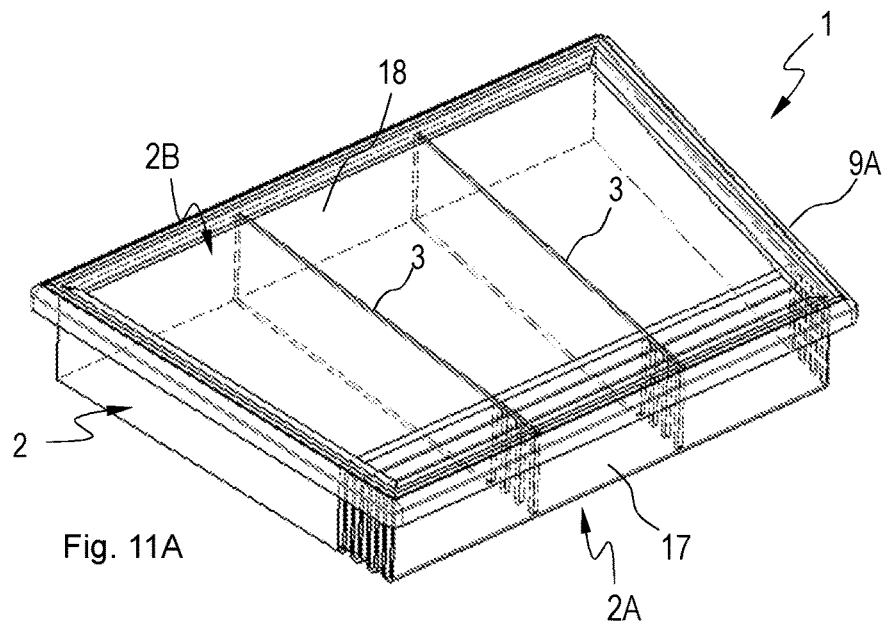
FIG. 11A shows a perspective view of a second embodiment of a filter element with adhesive walls extending through the filter element and trapezoidal outline.
Figure 11B:
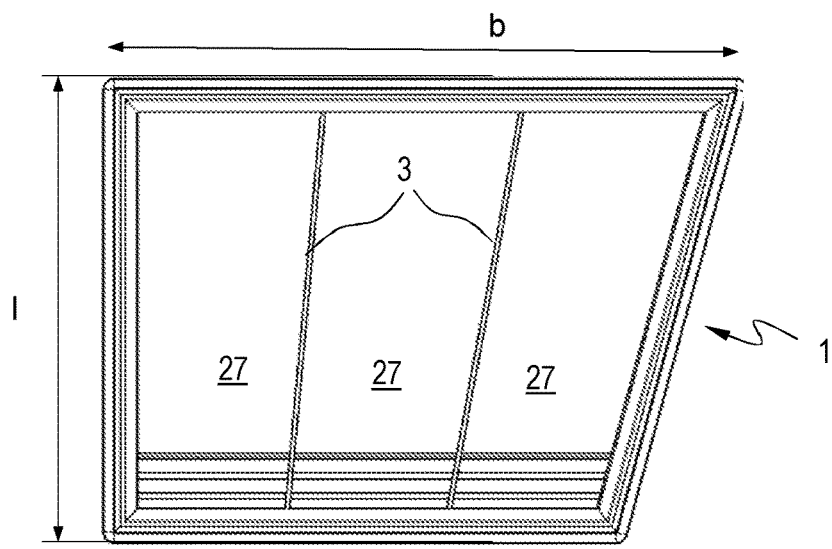
FIG. 11B shows a plan view of the filter element according to FIG. 11A.
Figure 11C:
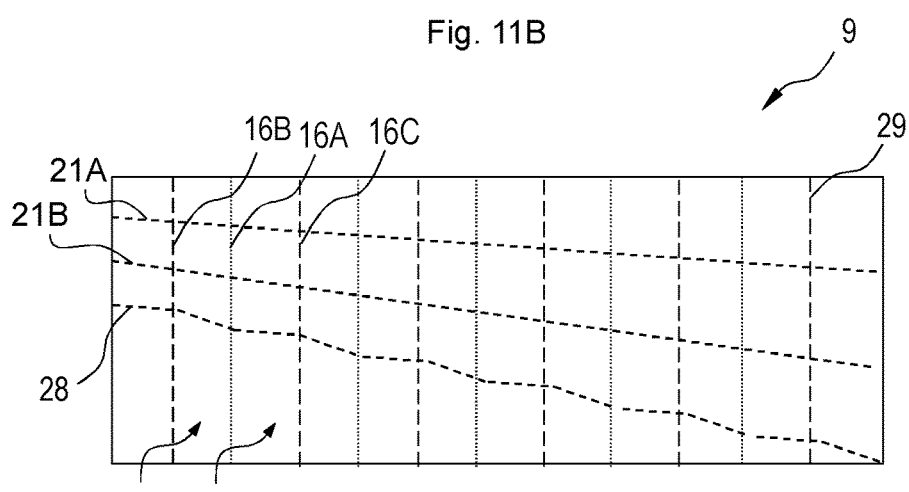
FIG. 11C shows a plan view of the unfolded filter medium for the filter element according to FIG. 11A.

FIG. 11A shows a perspective view of a second embodiment of a filter element 1. In FIG. 11B, a plan view of the filter element 1 illustrated in FIG. 11A is shown. The filter element 1 comprises a circumferentially extending polyurethane foam seal for attachment and sealing between raw and clean material side. In the region of the outer fold profiles (19, 20) of the folds, the sealing action is realized between raw and clean air region by a fluid-tight adhesive wall which is not illustrated. Two adhesive walls 3 extend through the filter element 1 illustrated in FIG. 11A and FIG. 11B in direction of the length l of the filter element 1. The adhesive walls 3 divide the fold pack 2 uniformly in regard to the width b in three fold pack sections 27 across the course of the length l. Beginning at a leading end fold 17, the adhesive wall 3 extends in this context toward an oppositely positioned rearward end fold 18 of the fold pack 2. The two adhesive walls 3 extend obliquely relative to the sequentially arranged fold edges 16. This is illustrated in FIG. 11C. FIG. 11C shows the unfolded filter medium 9. The fold lines 29 predetermine the course of the fold edges 16 of which in FIG. 11A only a selection is explicitly illustrated. The course of the two adhesive lines 21A, 21B is oblique to the fold lines 29. In addition, a cutting line 28 is illustrated in FIG. 11C. Along this line, the glued fold pack 2 is separated in order to obtain the trapezoidal outline.

Figure 12A:
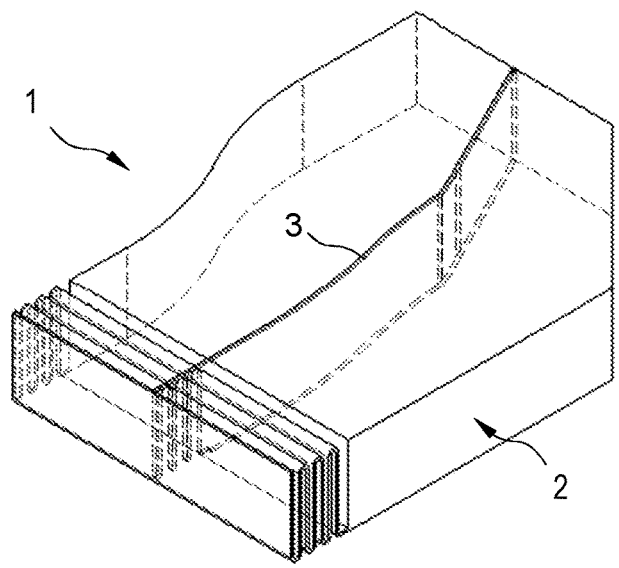
FIGS. 12A-12C show a perspective view and a plan view of a third embodiment of a filter element with an irregular outline and the associated unfolded filter medium.
Figure 12B:
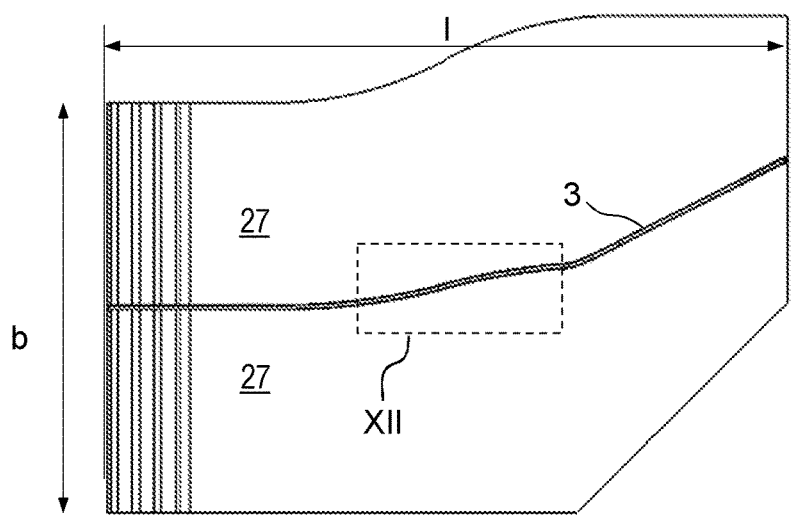
Figure 12C:
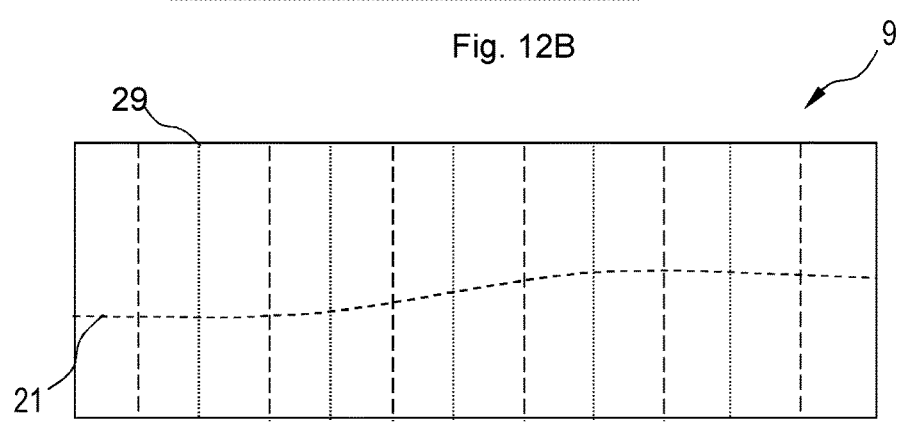

In FIG. 12A, a perspective view of a third embodiment of a filter element 1 is illustrated. The region XII marked by dashed lines in the plan view of FIG. 12B is shown enlarged as a detail view in FIG. 12 C as a detail of the unfolded filter medium. In this embodiment of the filter element 1, the adhesive wall 3 extends in the direction of the length l of the filter element 1 in a curved shape and/or at a slant. In this way, the adhesive wall 3 can adapt to the predetermined curved outer contour of the fold pack 2. The fold pack 2 is divided into fold pack sections 27 of the same width and suitable for stabilizing the fold pack. Preferably, the adhesive wall extends precisely at the center between the sides of the fold pack 2.

Figure 13A:
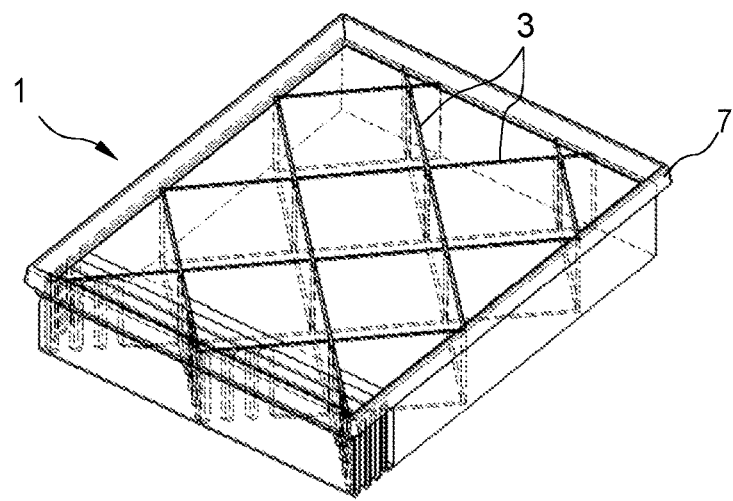
FIGS. 13A-13C show a perspective view and a plan view of a fourth embodiment of a filter element with adhesive walls crossing each other or contacting each other and the associated unfolded filter medium.
Figure 13B:
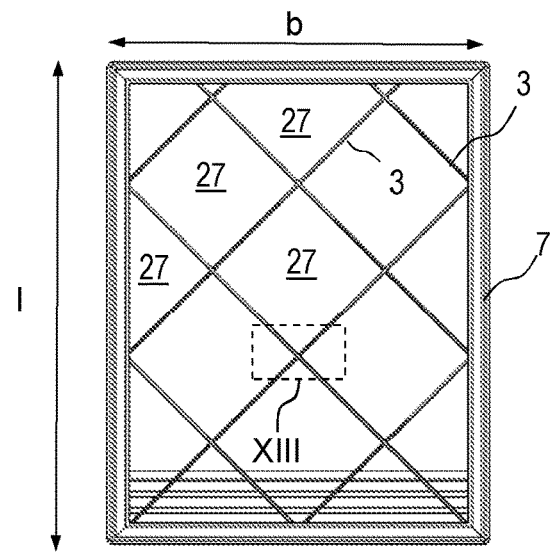
Figure 13C:
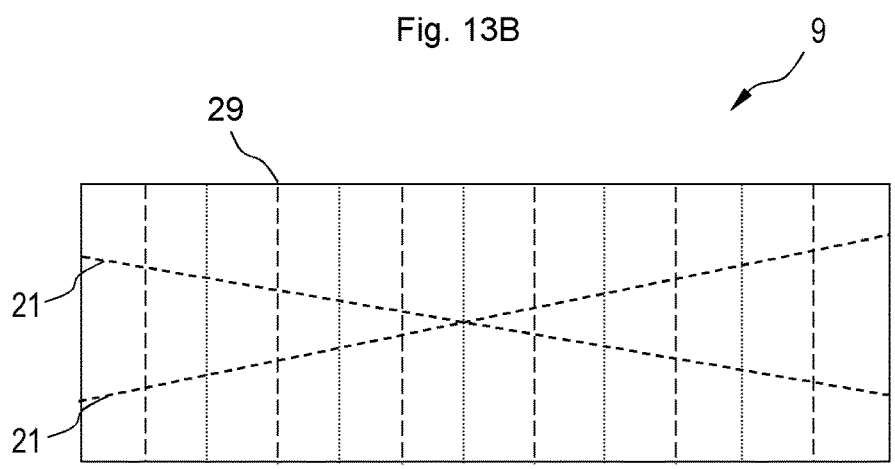

In FIG. 13, a fourth embodiment of a filter element 1 is illustrated. One can see in the plan view of FIG. 13B that the adhesive walls 3 cross each other and form a grid within the fold pack across its entire height and are fluid-tightly embodied. FIG. 13 C shows a detail view of the detail XIII marked in FIG. 13B. The segments which are formed of the regions 27 enclosed by the adhesive walls 3 can be provided with targeted inflow by a corresponding housing with inlet and outlet.

Figure 14A:
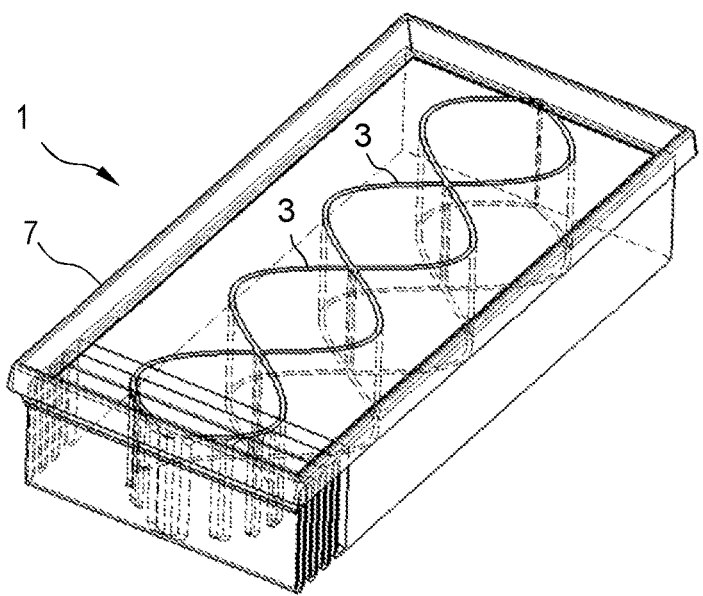
FIGS. 14A-14C show a perspective view and a plan view of a fifth embodiment of a filter element with curved adhesive walls intersecting each other and the associated unfolded filter medium.
Figure 14B:
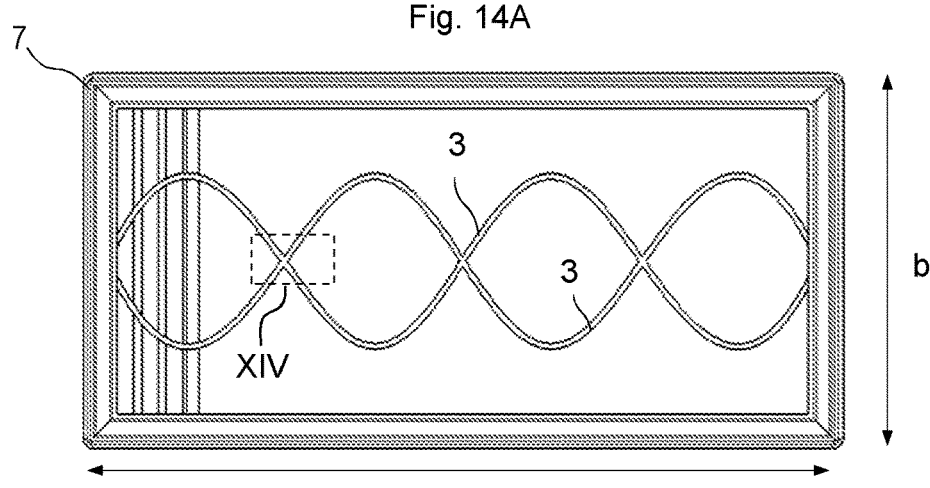
Figure 14C:
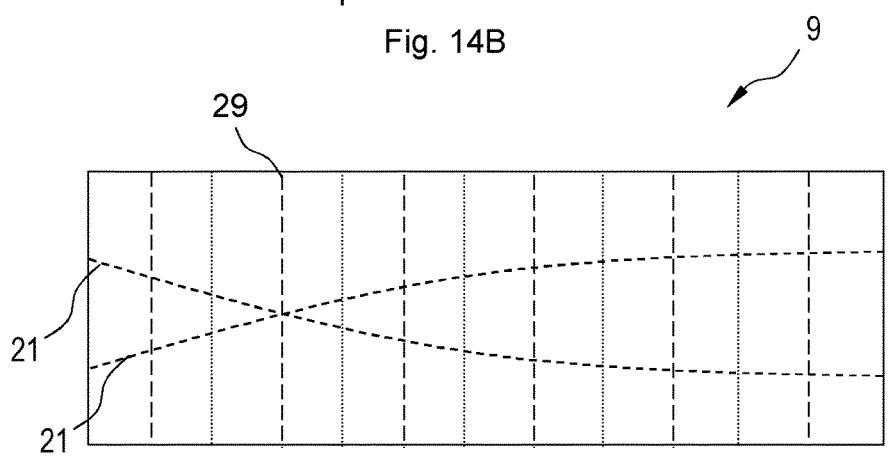

In FIG. 14, a fifth embodiment of a filter element 1 is illustrated in which the two adhesive walls extend in a sine shape along the length of the filter element 1. FIG. 14C shows a detail view of the detail XIV marked in FIG. 14B. Both adhesive walls 3 are spaced apart from the lateral rims of the filter element 1 and stabilize the fold pack particularly at the center along the longitudinal axis.

Figure 15A:
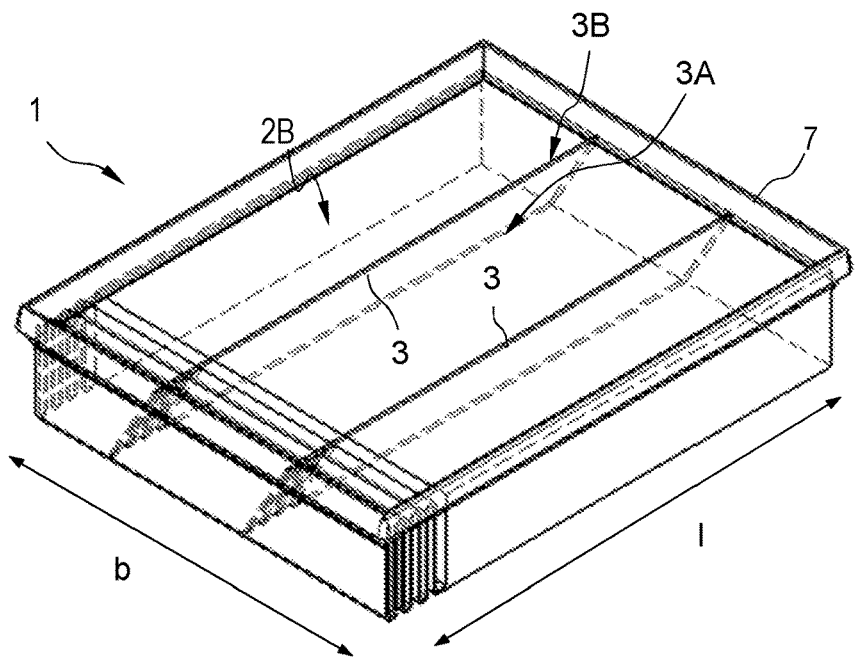
FIGS. 15A-15C show a perspective view and a plan view of a sixth embodiment of a filter element with adhesive walls slanted along the height and the associated unfolded filter medium.
Figure 15B:
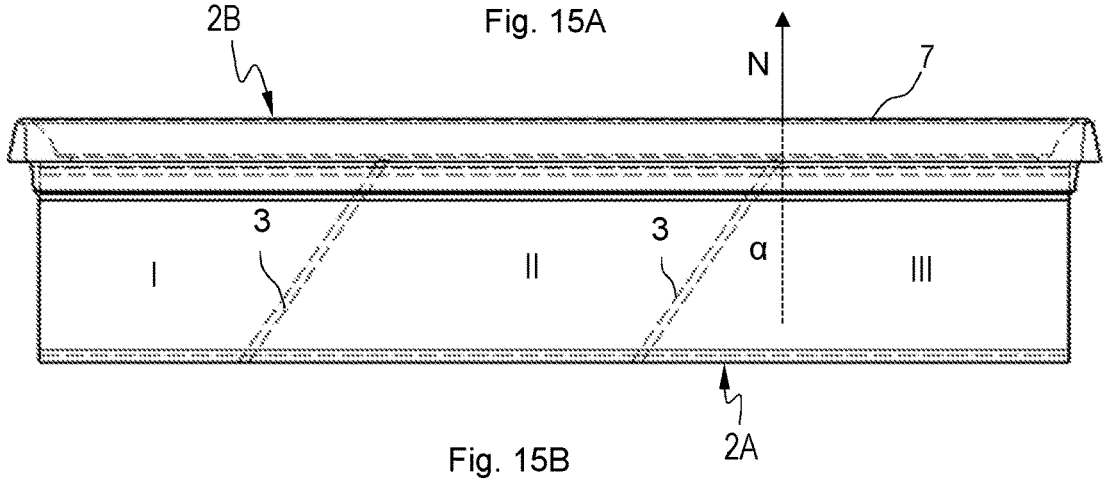
Figure 15C:
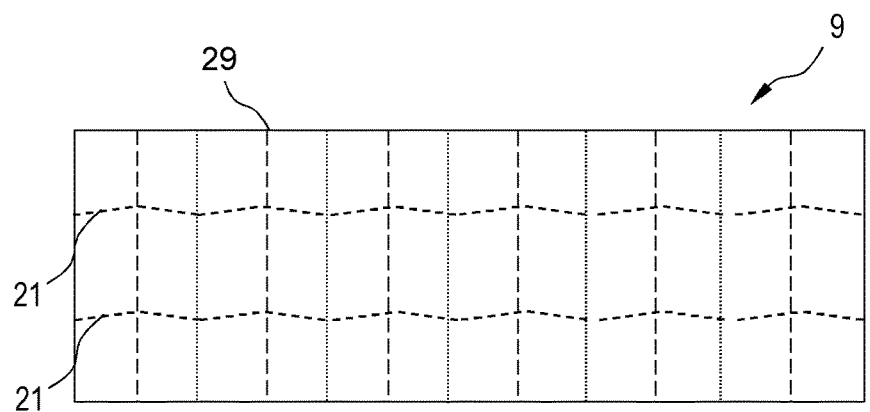

In FIG. 15, a sixth embodiment of a filter element 1 is illustrated. In this embodiment, two adhesive walls 3 extending parallel to each other are illustrated. The adhesive walls 3 extend adjacent to each other in direction of the length l of the fold pack 2. In this context, the adhesive walls 3 are slanted relative to the direction of height h of the fold pack 2. The adhesive walls 3 connect in this context the inflow side 2A to the outflow side 2B of the filter element 1. Due to the slant, a (re)direction of flow upon flow of the air between inflow side to the outflow side can be created. In this way, defined flow profiles in the inflow or outflow surface can be achieved. The two adhesive walls 3 are positioned in relation to a surface normal N of the outflow side 2B (and the inflow side 2A) at an angle α of approximately 45°. The inner regions I, II, and III delimited by the adhesive walls 3 have different flow properties. The cross section surface for flow therethrough is constant for the region II while the flow cross section of the region I increases. The flow cross section of the region III is reduced for flow therethrough. This has the result that in the region I the flow rate along the height from the inflow side 2A to the outflow side 2B decreases and increases in the region III. Due to the adhesive walls 3 which function as inner flow guiding elements, a flow distribution which is adapted to the respective installation situation can be adjusted within the filter element 1.

In an alternative embodiment, not illustrated, the adhesive walls 3 can be positioned relative to a surface normal N of the outflow side 2B (and the inflow side 2A) at angles α with opposite slant, for example, 45° and 315° ("−45°").

The angle α of the adhesive walls 3 can be embodied so as to vary in the direction of the length l of the fold pack 2. The adhesive walls 3 can extend at a slant, i.e., non-parallel, to each other and at a slant to the outer rim of the fold pack 2.

Figure 16A:
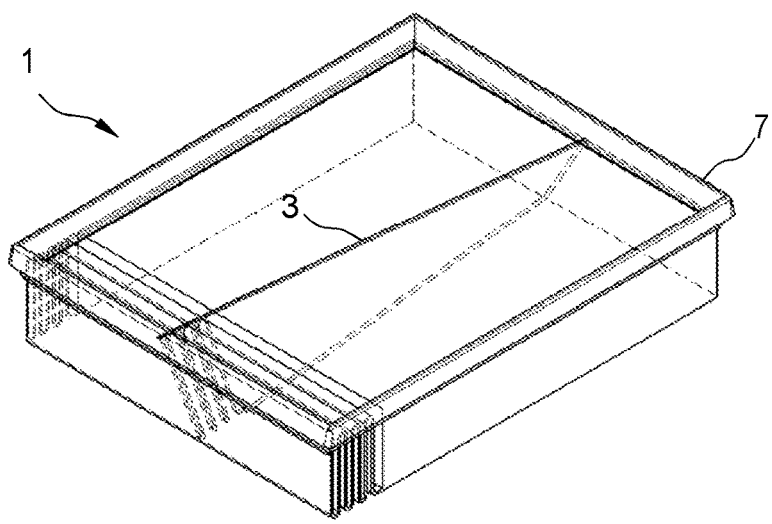
FIGS. 16A-16C show a perspective view and a plan view of a seventh embodiment of a filter element with an adhesive wall twisting along the length of the filter element and the associated unfolded filter medium.
Figure 16B:
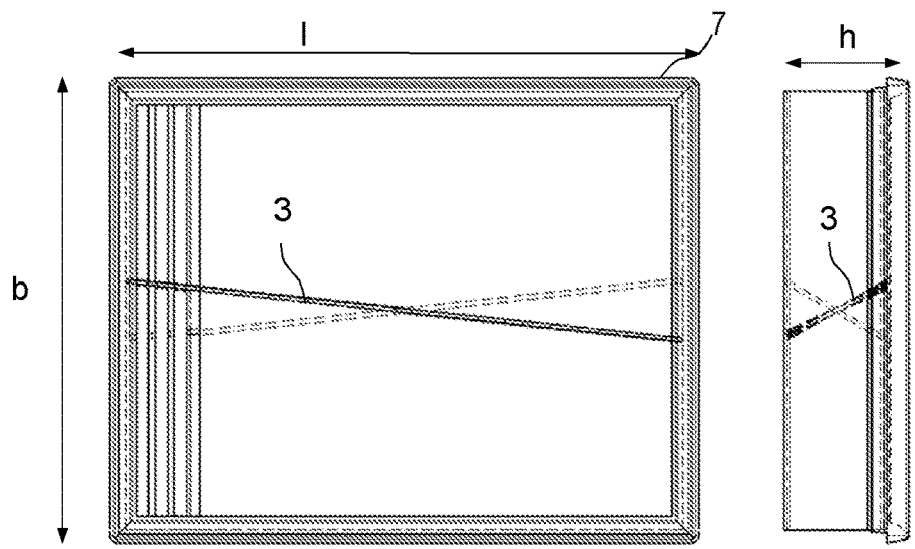
Figure 16C:
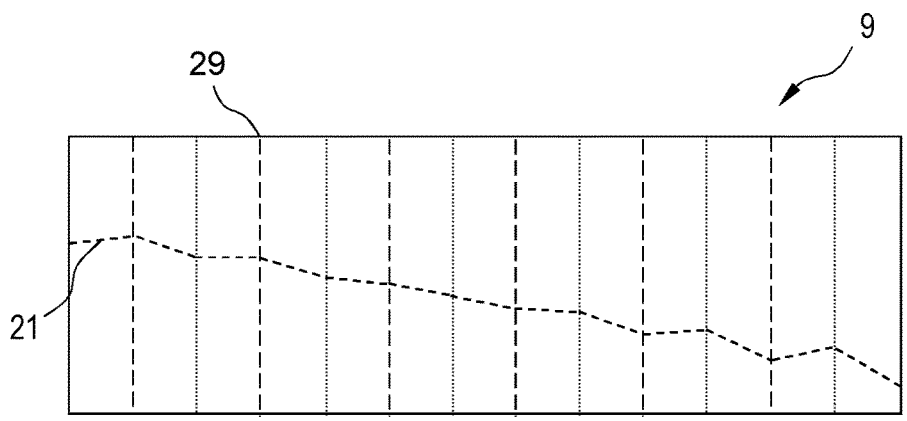

In FIG. 16, a seventh embodiment of a filter element 1 is illustrated. An adhesive wall 3 extending along the longitudinal direction is twisted and changes thus the slant relative to the height direction. The adhesive wall 3 therefore provides an inner reinforcement of the fold pack and enables at the same time a flow guiding action.

Figure 17A:
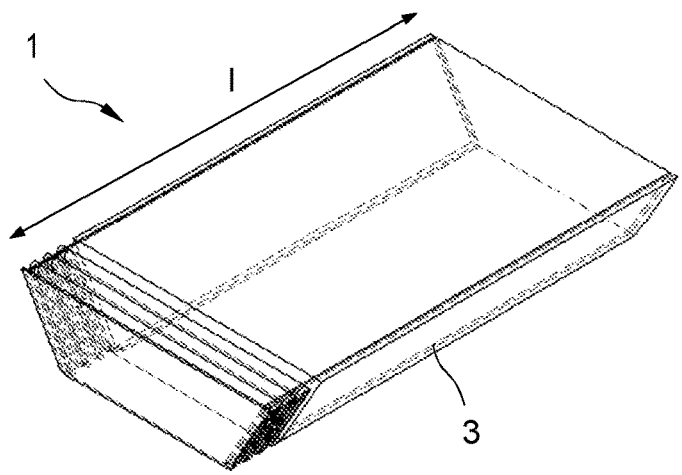
FIGS. 17A-17C show a perspective view and a plan view of an eighth embodiment of a filter element with laterally closing adhesive walls along slanted sides of the filter element and the associated unfolded filter medium.
Figure 17B:
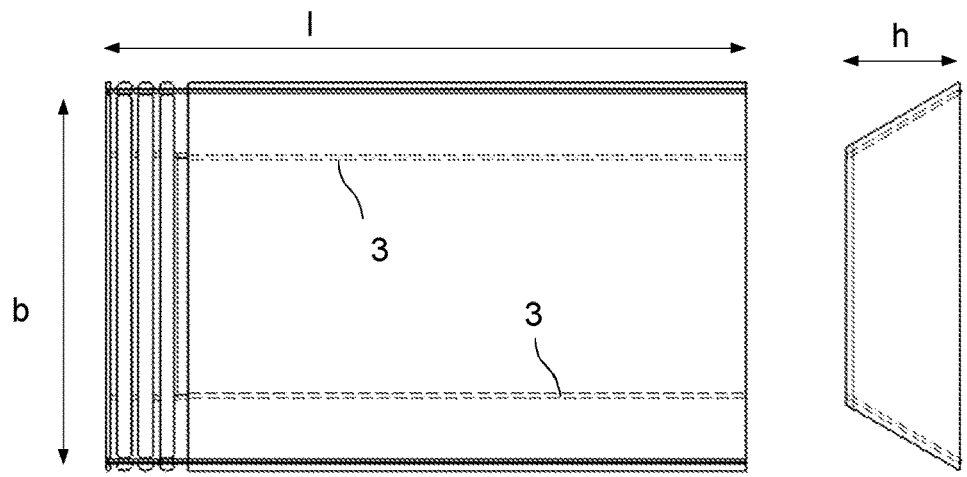
Figure 17C:
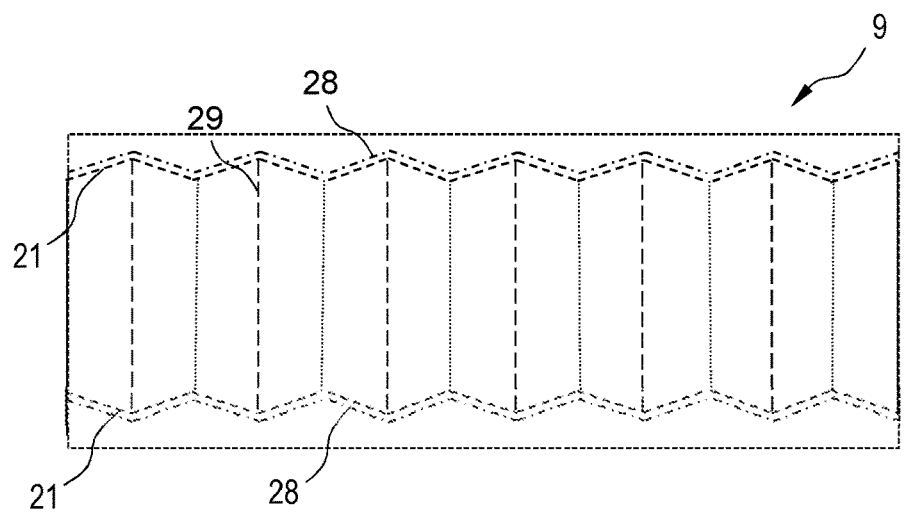

The eighth embodiment of a filter element 1 illustrated in FIG. 17 comprises two adhesive walls 3 extending at a slant. The adhesive walls 3 are obliquely arranged relative to the height h of the fold pack and oppositely slanted. The adhesive walls 3 form the fluid-tight sidewalls of the filter element 1. The adhesive walls laterally seal the filter element 1 fluid-tightly. Moreover, cutting lines 28 are indicated which extend parallel to the adhesive lines 21 and are slightly offset laterally outwardly.

Figure 18A:
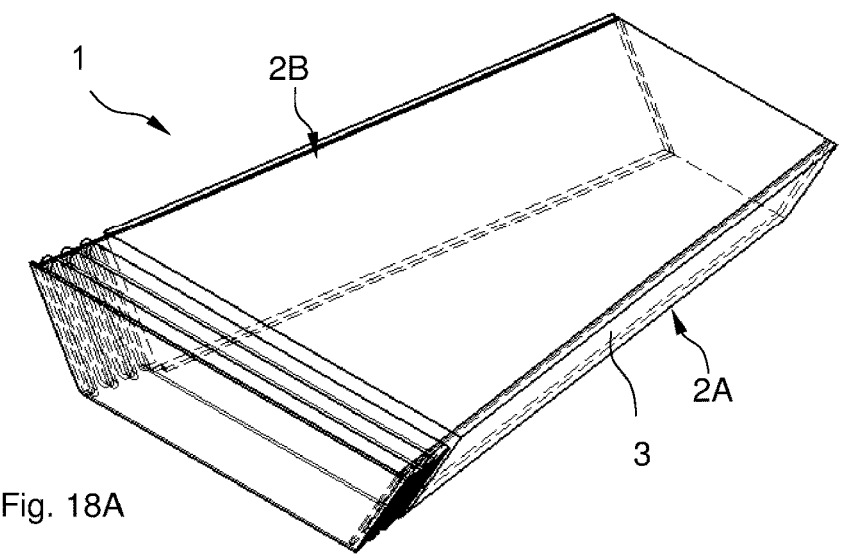
FIGS. 18A-18C show a perspective view and a plan view of a ninth embodiment of a filter element with lateral adhesive walls along slanted sides of the filter element with a tapering cross section along the length and the associated unfolded filter medium.
Figure 18B:
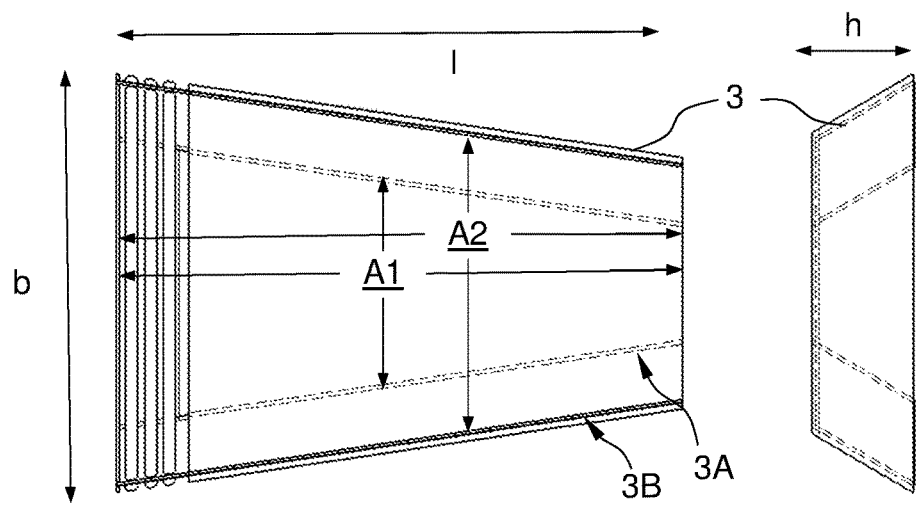
Figure 18C:
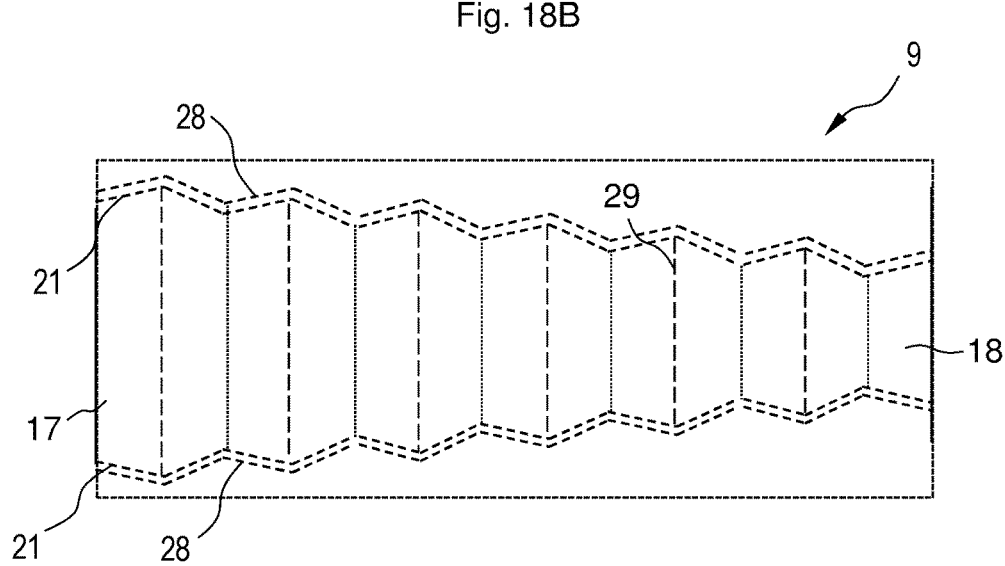

The ninth embodiment of the filter element 1 illustrated in FIG. 18 mostly corresponds to the seventh embodiment. In addition, the width of the filter element 1 changes along the longitudinal direction. In the orientation of FIG. 18, the passage of fluid is realized from the bottom to the top so that the inflow side 2A is located at the bottom and the outflow side 2B at the top. The inflow surface A1 and the outflow surface A2 are delimited by means of the adhesive walls 3 or their edges 3A, 3B. One can see that the inflow surface A1 is smaller than the outflow surface A2. Due to the cross-section surface increasing in flow direction, the flow rate of the fluid to be filtered is reduced.

This embodiment enables an improved utilization of the installation space in such a way that a filter surface as large as possible can be obtained in a given installation space.

In the further embodiments, cylinder-shaped filter elements 1 are implemented. In this context, the fold pack 2 is bent to a cylinder-shaped endless folded bellows. For this purpose, the end fold sections 17, 18 are connected to each other air-tightly for forming a round filter element. The respective adhesive walls 3 extend then radially between inner fold edges and outer fold edges.

Figure 19A:
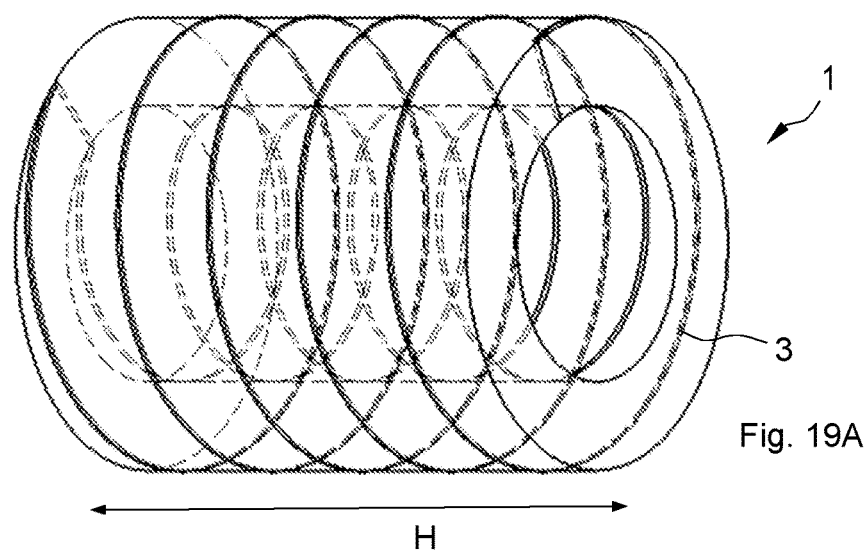
FIGS. 19A-19C show a perspective view and a plan view of a tenth embodiment of a filter element as round filter element with a spirally extending adhesive wall and the associated unfolded filter medium.
Figure 19B:
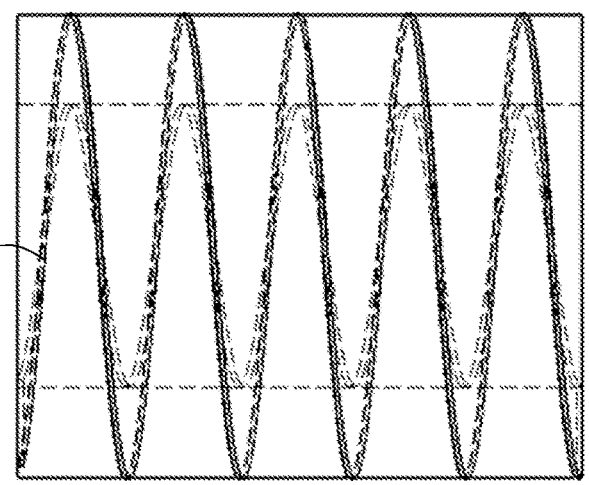
Figure 19C:
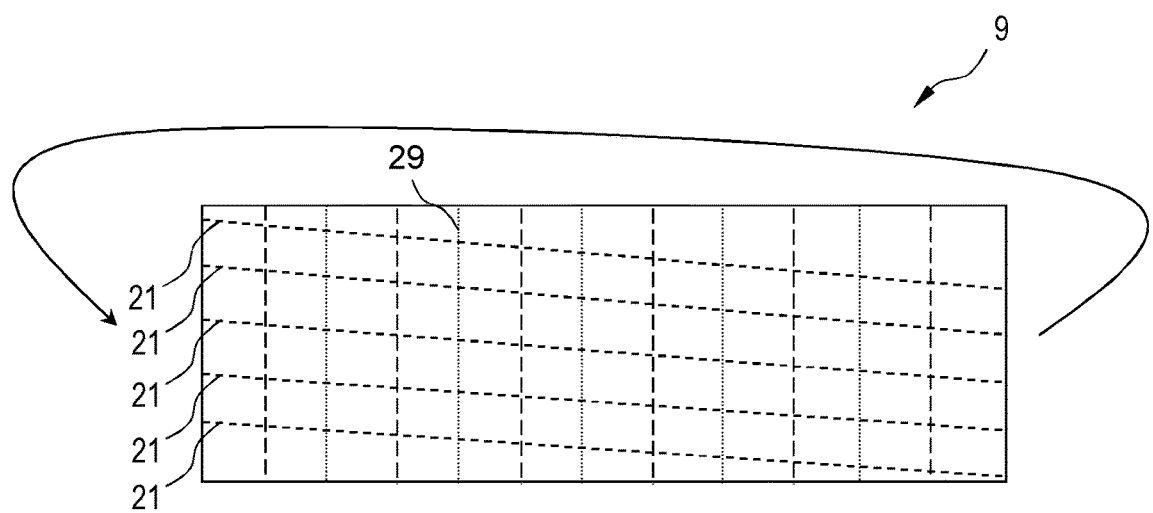

In FIG. 19A—FIG. 19C, a tenth embodiment is illustrated in which an adhesive wall 3 extends spirally along the height h of the cylinder-shaped filter element 1. Due to the continuous adhesive wall 3, a stabilization relative to forces radially and axially acting on the filter element 1 is provided.

Figure 20A:
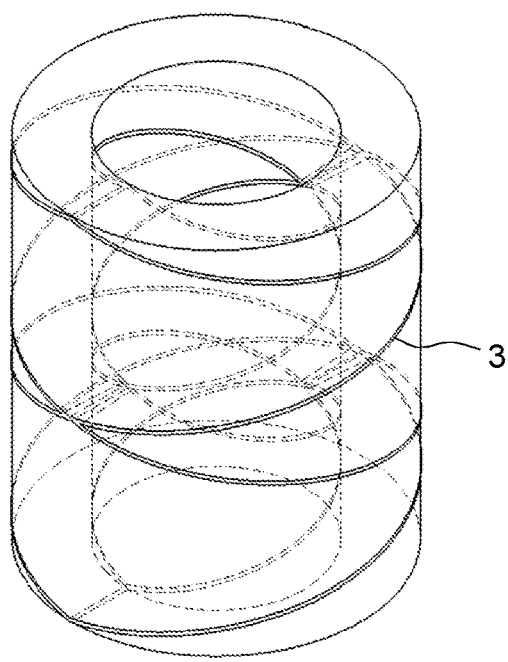
FIGS. 20A-20C show a perspective view and a plan view of an eleventh embodiment of a filter element as round filter element with spirally extending adhesive walls intersecting each other and the associated unfolded filter medium.
Figure 20B:
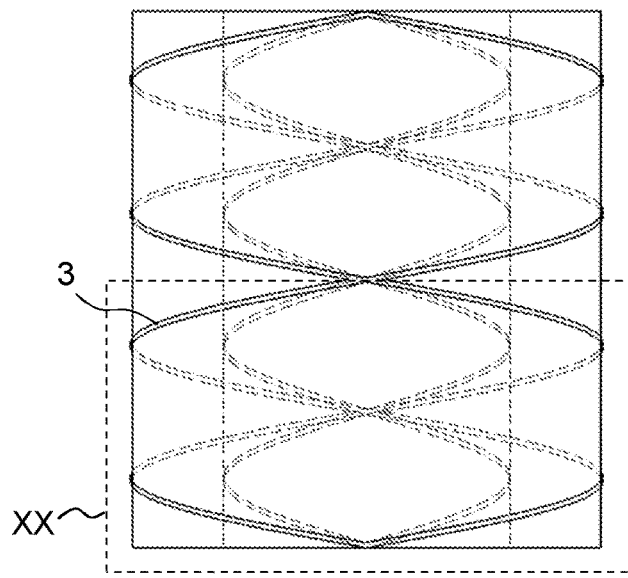
Figure 20C:
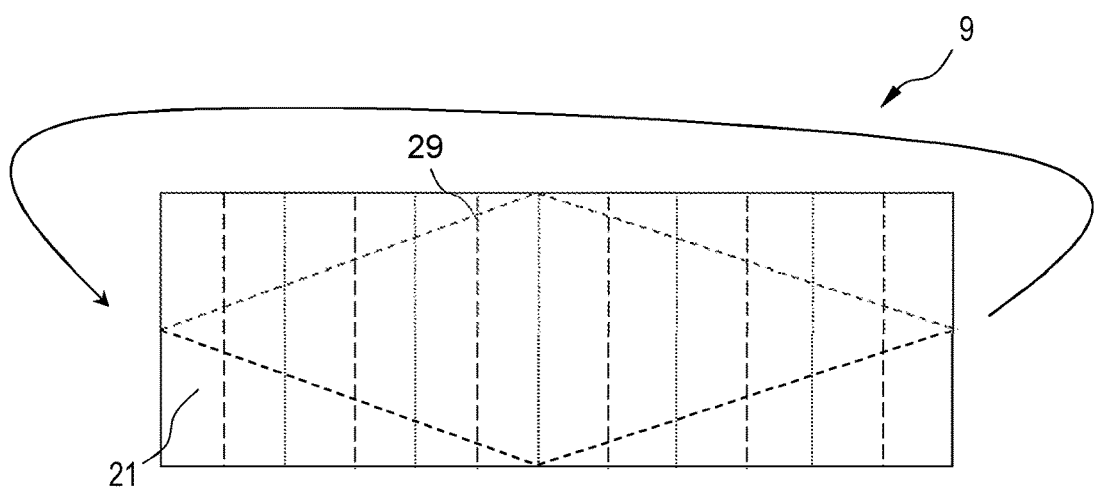

In FIGS. 20A-20C, an eleventh embodiment is illustrated in which two adhesive walls 3 extend spirally along the height of the cylinder-shaped filter element 1. The adhesive walls 3 extend in this context in opposite circumferential direction relative to each other and intersect each other. This is illustrated by the adhesive lines 21 shown in FIG. 20C which indicate the course of the adhesive walls in the detail XX marked in FIG. 20B.

Figure 21A:
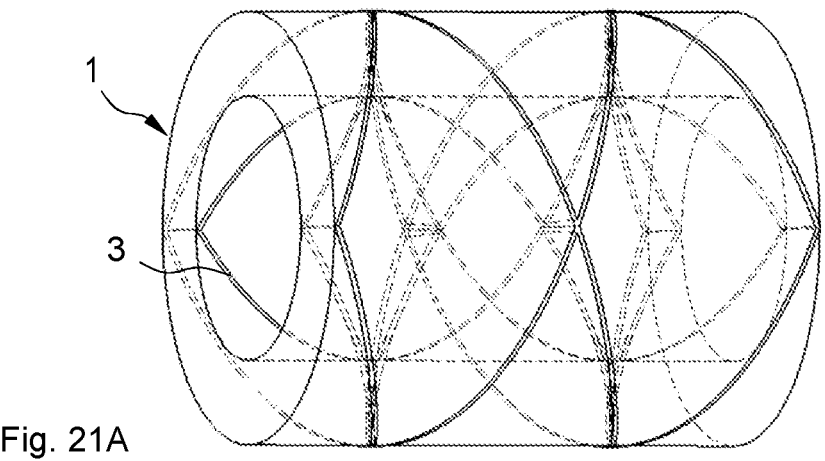
FIGS. 21A-21C show a perspective view and a plan view of a twelfth embodiment of a filter element as round filter element with spirally extending adhesive walls intersecting each other and the associated unfolded filter medium.
Figure 21B:
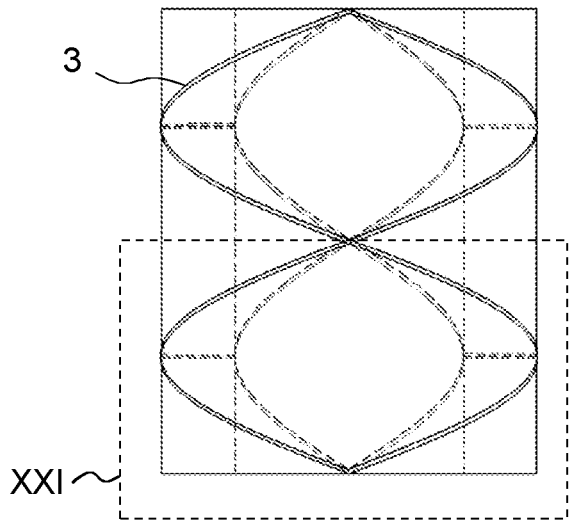
Figure 21C:
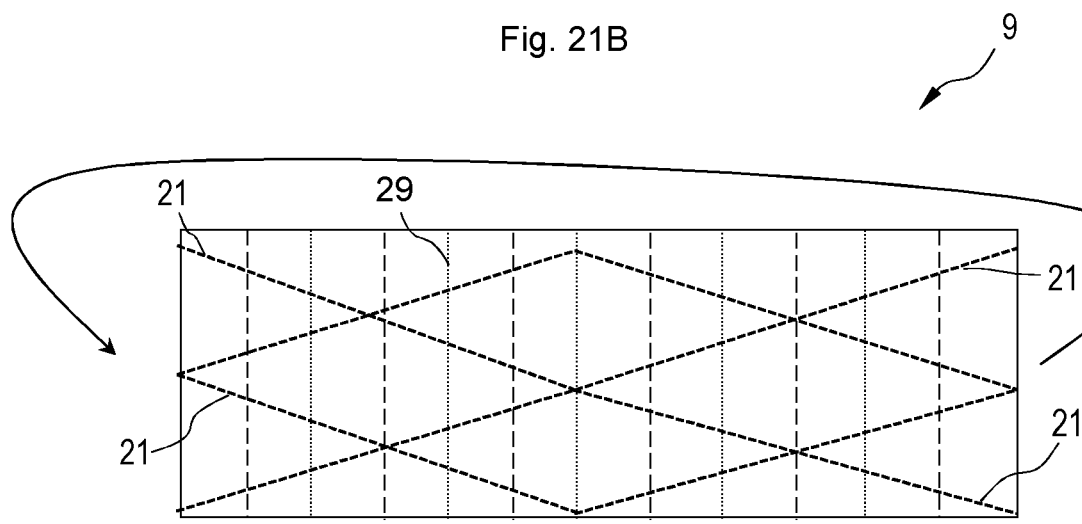

In FIG. 21A—FIG. 21C, a twelfth embodiment is illustrated in which four adhesive walls 3 extend spirally along the height of the cylinder-shaped filter element 1. Beginning at a common fold edge 16A, 16B, two adhesive walls 3 each extend in opposite circumferential direction relative to each other. The adhesive walls 3 extend across the height of the cylinder-shaped filter element 1. The course of the adhesive walls 3 is illustrated by the adhesive lines 21 illustrated in FIG. 21C. In this context, the course of the adhesive walls 3 is shown limited to the detail XXI marked in FIG. 21B.

The proposed adhesive connections of fold sections in the interior of the respective filter element permit a stabilization of the individual folds and of the entire fold pack or folded bellows which is adapted to the respective installation and flow situation. At the same time, an inner flow guiding action can be changed due to the flexible use of adhesive walls. As a whole, an improved filter performance in the respective application situation can be achieved.

What is claimed is:

1. A filter element for filtering a fluid, the filter element comprising:
   a fold pack formed of a filter medium folded in a zigzag shape and/or in a corrugated shape and comprising fold sections delimited by fold edges of the fold pack;
   wherein the fold sections include at least two directly neighboring fold sections connected to each other by a continuous adhesive connection comprised of an adhesive material and extending along an adhesive line that defines one or more adhesive walls;
   wherein the adhesive line extends at least in sections obliquely to a fold edge positioned between the at least two directly neighboring fold sections or the adhesive line extends offset along the fold edge positioned between the at least two directly neighboring fold sections;
   wherein the fold pack of the filter element has a width extending along the fold edges of the fold pack, a length extending transversely to the width, and a height extending transversely to the width and the length, the height of the fold pack measured between an inflow side and an outflow side of the fold pack;
   wherein the one or more adhesive walls divide the fold pack into a plurality of fold pack sections, and
   wherein a height of the one or more adhesive walls at least in sections is less than the height of the fold pack.

2. The filter element according to claim 1, wherein the adhesive material is arranged at the at least two directly neighboring fold sections exclusively at an inflow side of the filter element or at an outflow side of the filter element.

3. The filter element according to claim 1, wherein the adhesive material is applied continuously along the adhesive line between two of the fold edges delimiting at least one of the two directly neighboring fold sections.

4. The filter element according claim 1, wherein the at least two directly neighboring fold sections are positioned opposite each other and wherein portions of the adhesive line located at the at least two directly neighboring fold sections are positioned congruently opposite each other.

5. The filter element according to claim 1, wherein the adhesive connection is formed of two adhesive material applications joined to each other, wherein the two adhesive material applications adhere to the at least two directly neighboring fold sections, wherein the at least two directly neighboring fold sections are positioned opposite each other.

6. The filter element according to claim 5, wherein portions of the adhesive line of the at least two directly neighboring fold sections positioned opposite each other are obliquely positioned relative to each other such that the two adhesive material applications joined to each other are joined across an entire course of the portions of the adhesive line at or on the at least two directly neighboring fold sections positioned opposite each other.

7. The filter element according to claim 1, wherein the adhesive material is attached to outwardly facing ones of the fold edges and between the at least two directly neighboring fold sections.

8. The filter element according to claim 1, comprising two or more of the adhesive connection, wherein the respective adhesive lines of the two or more adhesive connections are spaced apart from each other and each extend at least in sections obliquely to the fold edge positioned between the at least two directly neighboring fold sections or extend offset along the fold edge positioned between the at least two directly neighboring fold sections.

9. The filter element according to claim 8, wherein a spacing between the respective adhesive lines which are neighboring each other measured along the fold edges changes between different ones of the fold edges.

10. The filter element according to claim 1, wherein the adhesive connection extends across a plurality of the at least two directly neighboring fold sections connected to each other by the adhesive material and across a plurality of the fold edges, and wherein the adhesive connection forms the one or more adhesive walls in the fold pack.

11. A filter element for filtering a fluid, the filter element comprising:
    a fold pack comprising an inflow side and an outflow side;
    the fold pack comprising a filter medium folded in a zigzag shape or a corrugated shape; and
    one or more adhesive walls comprised of an adhesive material extending within the fold pack and formed by adhesive connections of continuous adhesive material between directly neighboring fold sections of the fold pack;
    wherein the fold pack of the filter element has a width extending along fold edges of the fold pack, a length extending transversely to the width, and a height extending transversely to the width and the length, the height of the fold pack measured between the inflow side and the outflow side of the fold pack:
    wherein the one or more adhesive walls divide the fold pack into a plurality of fold pack sections, and
    wherein the one or more adhesive walls extend at a slant and/or at a curve in a direction of the height of the fold pack of the filler element.

12. The filter element according to claim 11, wherein the one or more adhesive walls extend at a slant and/or at a curve in a direction of the length.

13. The filter element according to claim 11, wherein the one or more adhesive walls extend between the inflow side and fold edges of the outflow side or the one or more adhesive walls extend between the outflow side and fold edges of the inflow side.

14. The filter element according to claim 13, wherein the one or more adhesive walls connect the inflow side and the outflow side to each other.

15. The filter element according to claim 13, wherein the one or more adhesive walls comprise an inflow side edge and an outflow side edge, wherein the inflow side edge delimits a width of an inflow surface of the filter element, and wherein the outflow side edge delimits a width of an outflow surface of the filter element.

16. The filter element according to claim 15, wherein the inflow surface of the filter element has a different size and/or a different geometry than the outflow surface of the filter element.

17. The filter element according to claim 11, wherein the one or more adhesive walls form a flow guiding element in the interior of the fold pack.

18. The filter element according to claim 11, wherein the one or more adhesive walls separate a clean fluid region of the filter element from a raw fluid region of the filter element.

19. The filter element according to claim 11, wherein the one or more adhesive walls are interrupted along the length of the fold pack of the filter element and/or spaced apart from an end face of the fold pack of the filter element.

20. The filter element according to claim 11, wherein the one or more adhesive walls have a closed shape in the fold pack.

21. The filter element according to claim 11, wherein the one or more adhesive walls laterally seal the fold pack fluid-tightly.

22. The filter element according to claim 11, wherein the one or more adhesive walls comprise at least a pair of adhesive walls that intersect or contact each other.

23. The filter element according to claim 22, wherein the width of the fold pack is divided uniformly along the length of the fold pack of the filter element by spacings between the adhesive walls and spacings between the adhesive walls and sides of the fold pack of the filter element.

24. The filter element according to claim 11, wherein the fold pack is bent to a cylinder-shaped endless folded bellows.

25. The filter element according to claim 11, wherein the adhesive material is selected from the group consisting of solvent-containing wet adhesives, contact adhesives, dispersion adhesives, hot melt adhesives, plastisols, polyaddition adhesives, polycondensation adhesives, polymerization adhesives, and dry-bond adhesives.

26. A filter element for filtering a fluid, the filter element comprising:
a fold pack comprising an inflow side and an outflow side;
the fold pack comprising a filter medium folded in a zigzag shape or a corrugated shape, and
one or more adhesive walls comprised of an adhesive material extending within the fold pack and formed by adhesive connections of continuous adhesive material between directly neighboring fold sections of the fold pack;
wherein the fold pack of the filter element has a width extending along fold edges of the fold pack, a length extending transversely to the width, and a height extending transversely to the width and the length, the height of the fold pack measured between the inflow side and outflow side of the fold pack:
wherein the one or more adhesive walls divide the fold pack into a plurality of fold pack sections, and
wherein a height of the one or more adhesive walls at least in sections is less than the height of the fold pack of the filter element.

27. A filter element for filtering a fluid, the filter element comprising:
a fold pack comprising an inflow side and an outflow side:
the fold pack comprising a filter medium folded in a zigzag shape or a corrugated shape:
the fold pack comprising a height measure between the inflow side and the outflow side; and
one or more adhesive walls comprised of an adhesive material extending within the fold pack and formed by adhesive connections of continuous adhesive material between directly neighboring fold sections of the fold pack;
wherein the one or more adhesive walls are positioned at least in sections along the height of the fold pack at an angle between about 5° and about 90° relative to a surface normal of the inflow side or of the outflow side.

28. A method for producing a filter element, the method comprising:
providing a flat filter medium;
applying a viscous adhesive material along one or more adhesive lines onto the flat filter medium;
folding the filter medium along fold lines delimiting neighboring fold sections to form fold edges between the neighboring fold sections;
curing the viscous adhesive material to form a continuous adhesive connection of the adhesive material between the neighboring fold sections;
wherein the one or more adhesive lines at least in sections extend obliquely to or offset along the fold lines positioned between respective neighboring fold sections.

29. The method according to claim 28, applying the viscous adhesive material in a flowable state.

30. The method according to claim 28, applying the viscous adhesive material through an application nozzle moveable along the fold lines.

31. The method according to claim 28, applying the viscous adhesive material by continuous extrusion through an application nozzle moveable along the fold lines.

32. The method according to 28, applying the viscous adhesive material by interrupting an adhesive application at least in sections along the one or more adhesive lines.

33. The method according to claim 28, comprising at least a pair of the adhesive lines, and applying the viscous adhesive material simultaneously along the pair of adhesive lines.

* * * * *